(12) United States Patent
Taylor et al.

(10) Patent No.: US 10,045,641 B2
(45) Date of Patent: Aug. 14, 2018

(54) PALLET LIFTING SYSTEM

(71) Applicant: LIFT2SELL, LLC, Chagrin Falls, OH (US)

(72) Inventors: Curtis Taylor, Chagrin Falls, OH (US); Aaron Misener, Chagrin Falls, OH (US); Thomas L. Rattini, Foristell, MO (US); Robert H. Unnerstall, Jr., Wentzville, MO (US); Robert Myler, Winfield, MO (US)

(73) Assignee: Lift2Sell, LLC, Cleveland, OH (US)

( * ) Notice: Subject to any disclaimer, the term of this patent is extended or adjusted under 35 U.S.C. 154(b) by 344 days.

(21) Appl. No.: 14/601,432

(22) Filed: Jan. 21, 2015

(65) Prior Publication Data

US 2015/0128832 A1    May 14, 2015

Related U.S. Application Data

(63) Continuation-in-part of application No. 13/348,878, filed on Jan. 12, 2012, now Pat. No. 9,149,131.

(60) Provisional application No. 61/432,421, filed on Jan. 13, 2011, provisional application No. 61/930,140, filed on Jan. 22, 2014.

(51) Int. Cl.
| | |
|---|---|
| *B66F 7/06* | (2006.01) |
| *B66F 5/02* | (2006.01) |
| *B66F 7/10* | (2006.01) |
| *A47F 5/10* | (2006.01) |
| *F16M 11/38* | (2006.01) |
| *A47F 3/14* | (2006.01) |
| *A47F 5/00* | (2006.01) |

(52) U.S. Cl.
CPC .................. *A47F 5/10* (2013.01); *A47F 3/14* (2013.01); *A47F 5/0081* (2013.01); *F16M 11/38* (2013.01)

(58) Field of Classification Search
CPC .... B66F 7/065; B66F 7/0666; B66F 2700/04; B66F 7/10; B66F 7/14; A47F 3/14; A47F 5/0081
USPC .................. 187/240, 211, 214; 254/122, 124
See application file for complete search history.

(56) References Cited

U.S. PATENT DOCUMENTS

| | | | |
|---|---|---|---|
| 1,840,591 A | | 1/1932 | Mather |
| 2,692,177 A | * | 10/1954 | Larsen ..................... B65G 1/07 267/287 |
| 2,764,869 A | * | 10/1956 | Scherr ....................... B60P 1/02 105/164 |
| 3,203,670 A | * | 8/1965 | Farris .................... B66F 7/0666 108/120 |
| 3,237,921 A | | 3/1966 | Jay |
| 4,063,619 A | | 12/1977 | Drews |

(Continued)

FOREIGN PATENT DOCUMENTS

| | | | | |
|---|---|---|---|---|
| GB | 607146 A | * | 8/1948 | ........... B66F 7/0608 |
| JP | 06127298 A | * | 5/1994 | |

*Primary Examiner* — William E Dondero
*Assistant Examiner* — Diem M Tran
(74) *Attorney, Agent, or Firm* — Fay Sharpe LLP

(57) ABSTRACT

A pallet lifter for raising and lowering a pallet. The pallet lifter includes a pallet platform and a movement mechanism that controllably causes the pallet platform to raise and lower. The pallet platform includes a top surface designed to support a pallet, two side walls, and a back wall. The movement mechanism includes a motor and a threaded rod. The electric motor is designed to cause the threaded rod to rotate in a clockwise and counterclockwise direction to cause said pallet platform to raise and lower.

5 Claims, 26 Drawing Sheets

(56) References Cited

U.S. PATENT DOCUMENTS

| | | | |
|---|---|---|---|
| 4,690,606 A * | 9/1987 | Ross | B64F 1/32 |
| | | | 187/214 |
| 4,954,760 A * | 9/1990 | Futch | B65G 1/07 |
| | | | 211/1.51 |
| 5,211,265 A | 5/1993 | Gregg | |
| 5,322,143 A | 6/1994 | Curran | |
| 5,581,057 A | 12/1996 | Ferrario et al. | |
| 6,045,122 A | 4/2000 | Torres | |
| 6,182,796 B1 | 2/2001 | Perlstein et al. | |
| 7,055,802 B1 | 6/2006 | Jones et al. | |
| 7,219,768 B2 | 5/2007 | Yamanouchi et al. | |
| 7,383,923 B2 | 6/2008 | Patten et al. | |
| 8,056,701 B2 | 11/2011 | Sugimoto | |
| 2008/0000393 A1 | 1/2008 | Wilson et al. | |
| 2008/0169158 A1 | 7/2008 | Lam | |
| 2009/0078509 A1 | 3/2009 | Olsen et al. | |
| 2011/0309228 A1 | 12/2011 | Cox et al. | |
| 2014/0014886 A1 | 1/2014 | Ruth Sen | |

\* cited by examiner

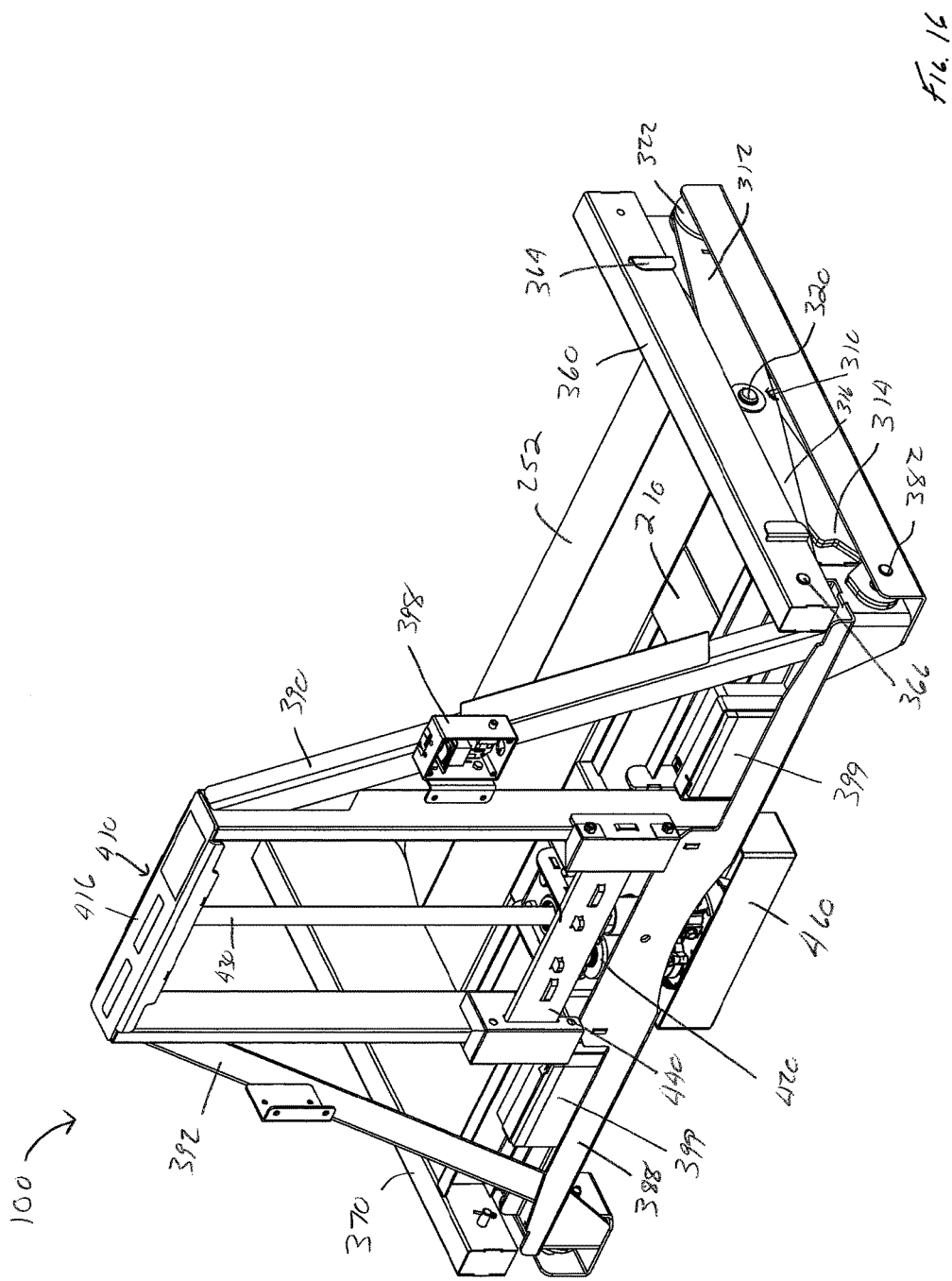

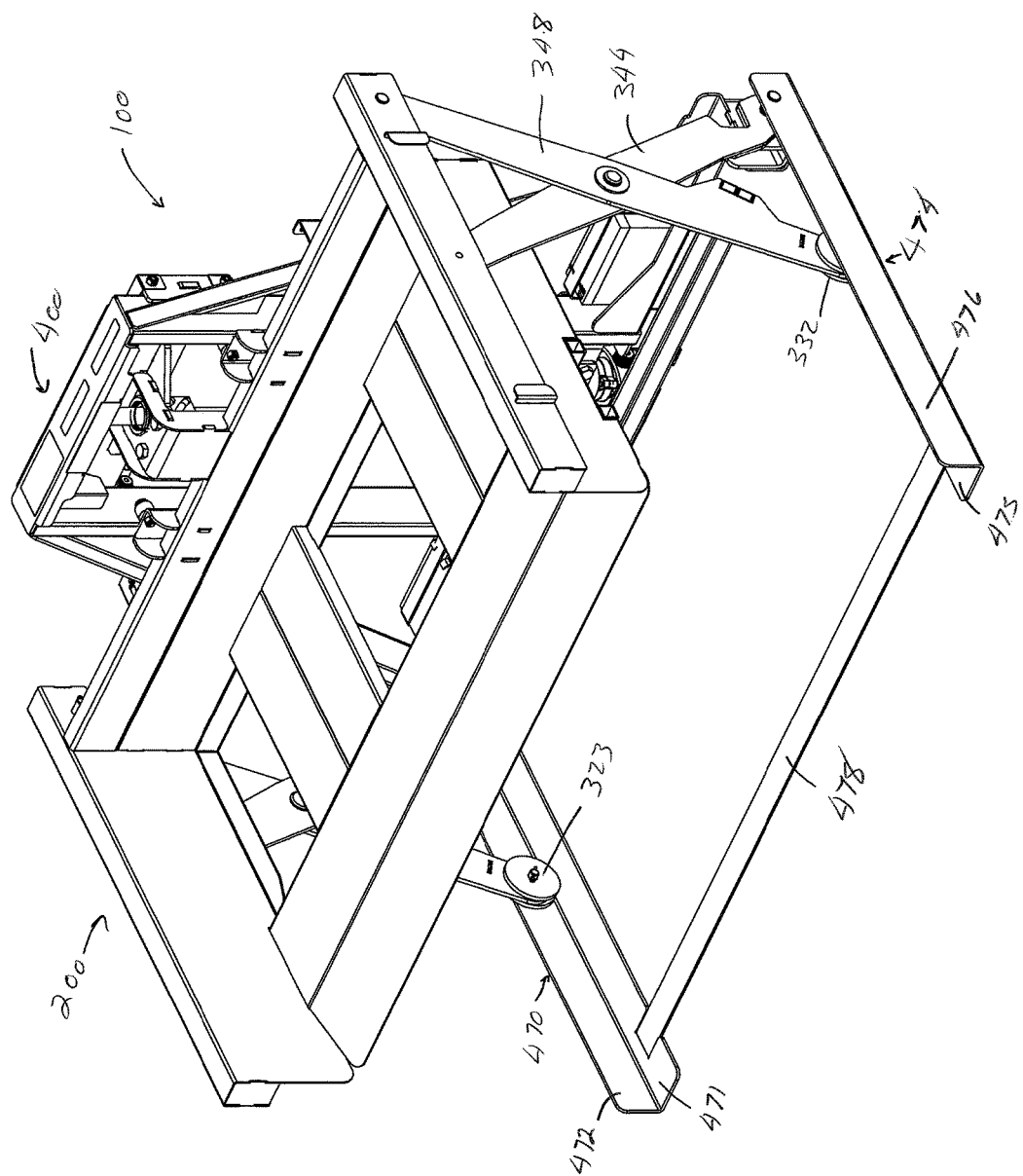

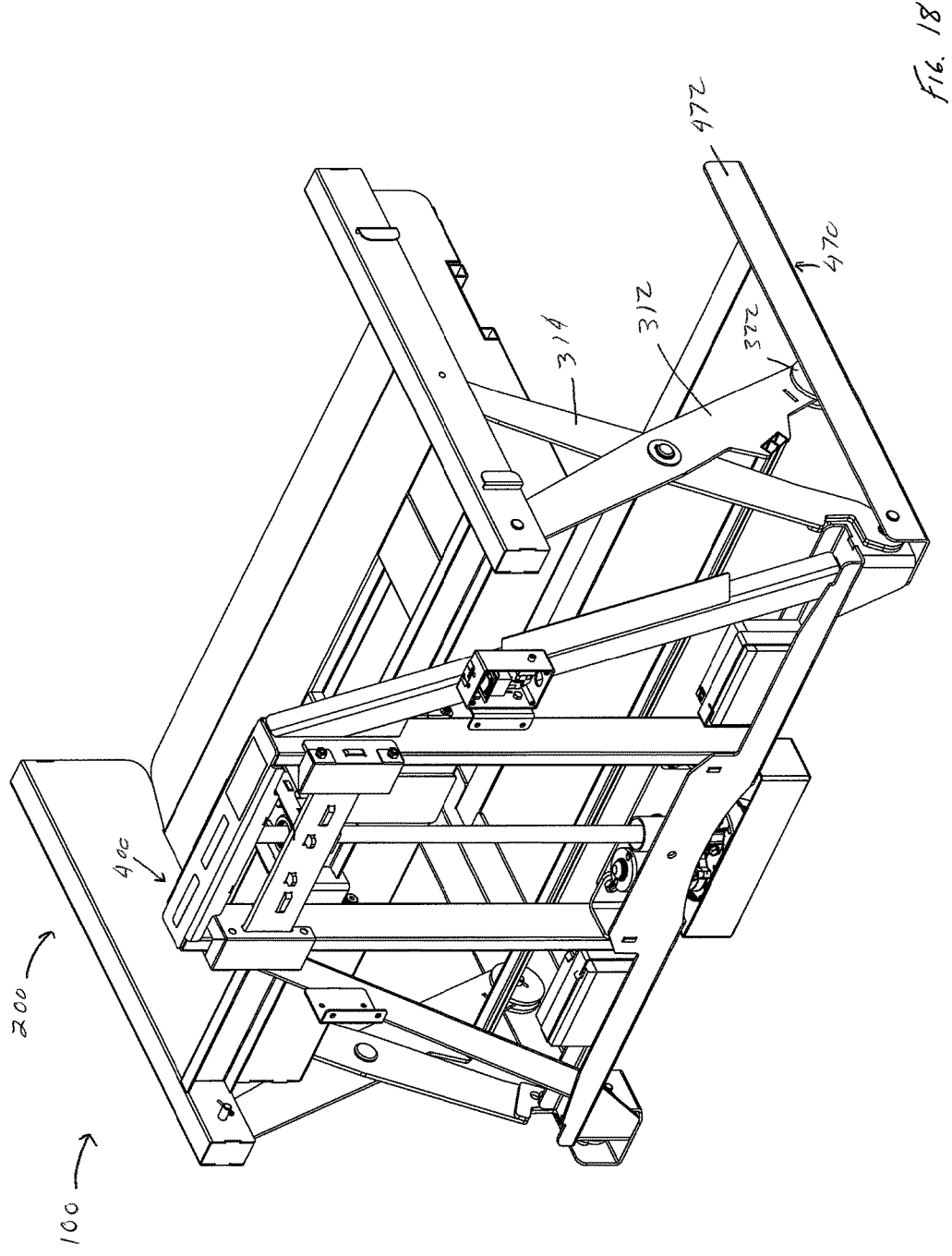

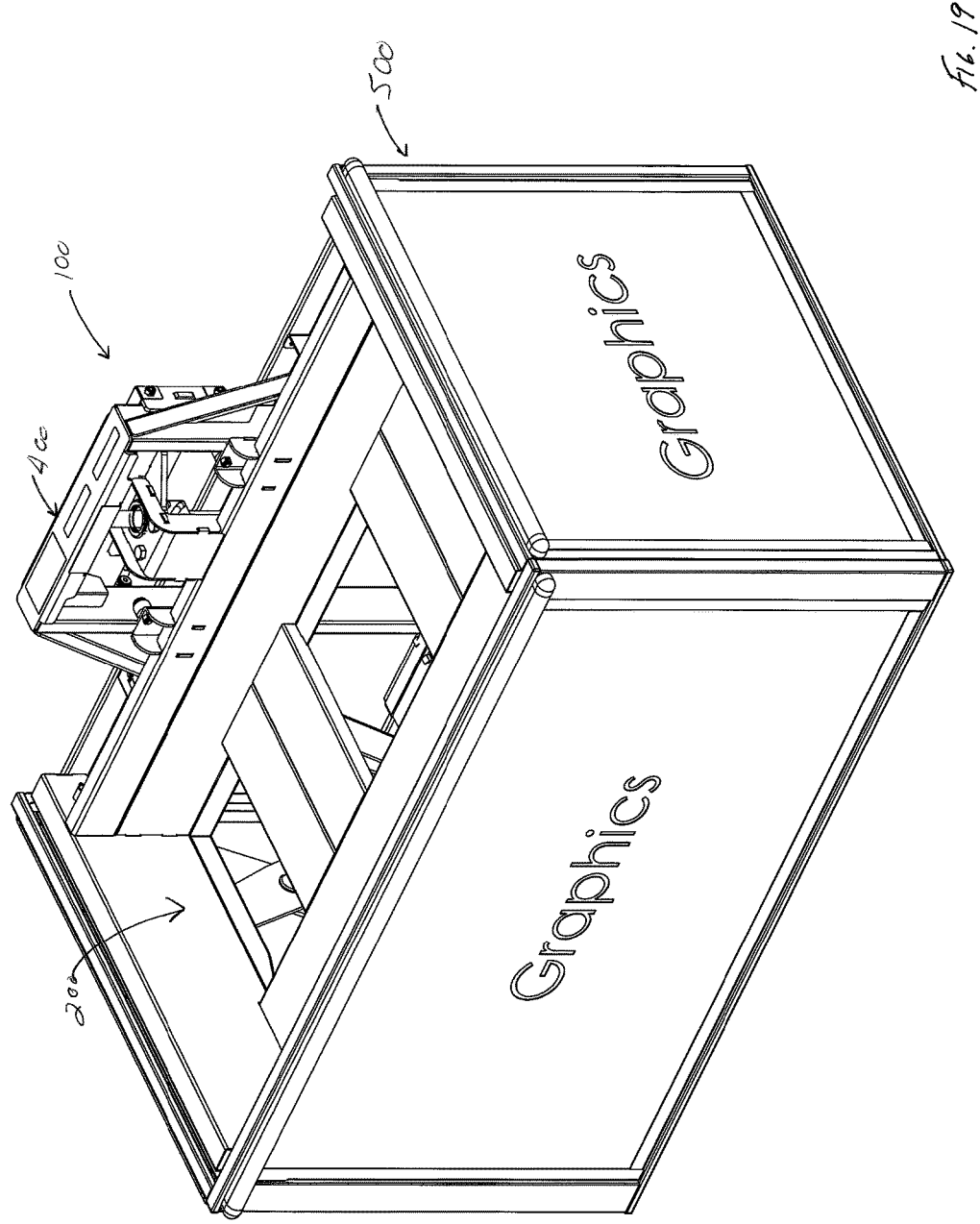

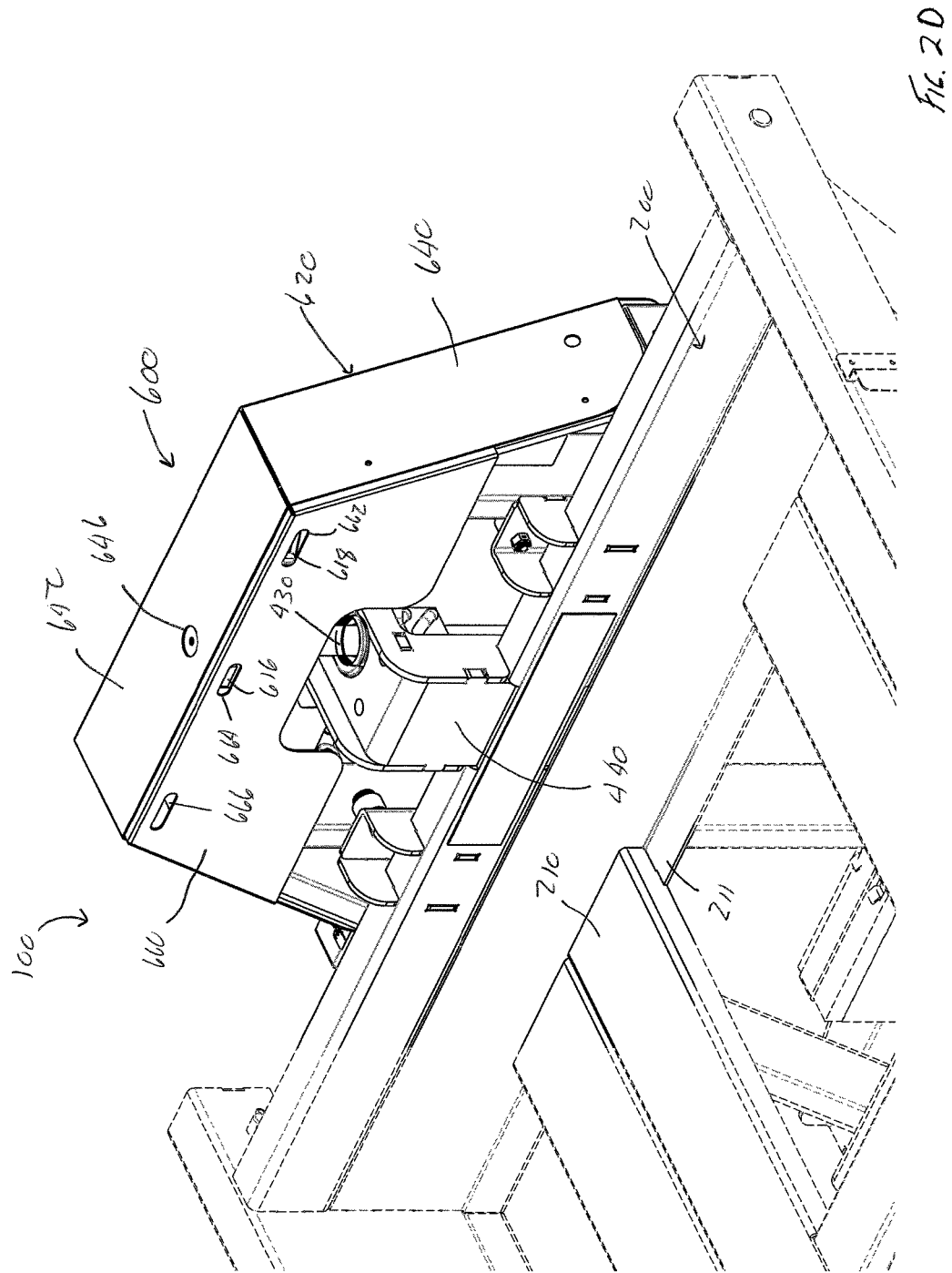

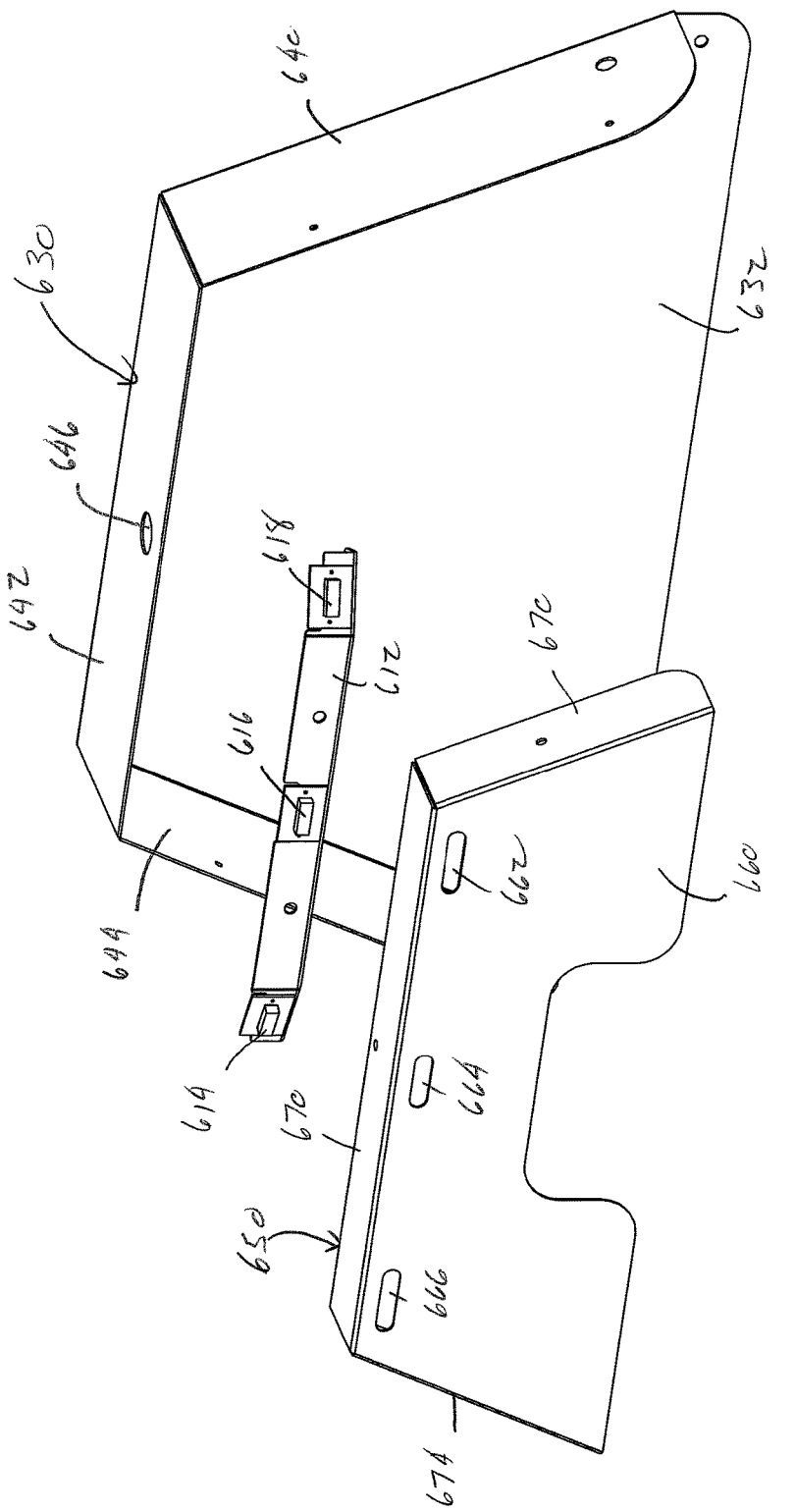

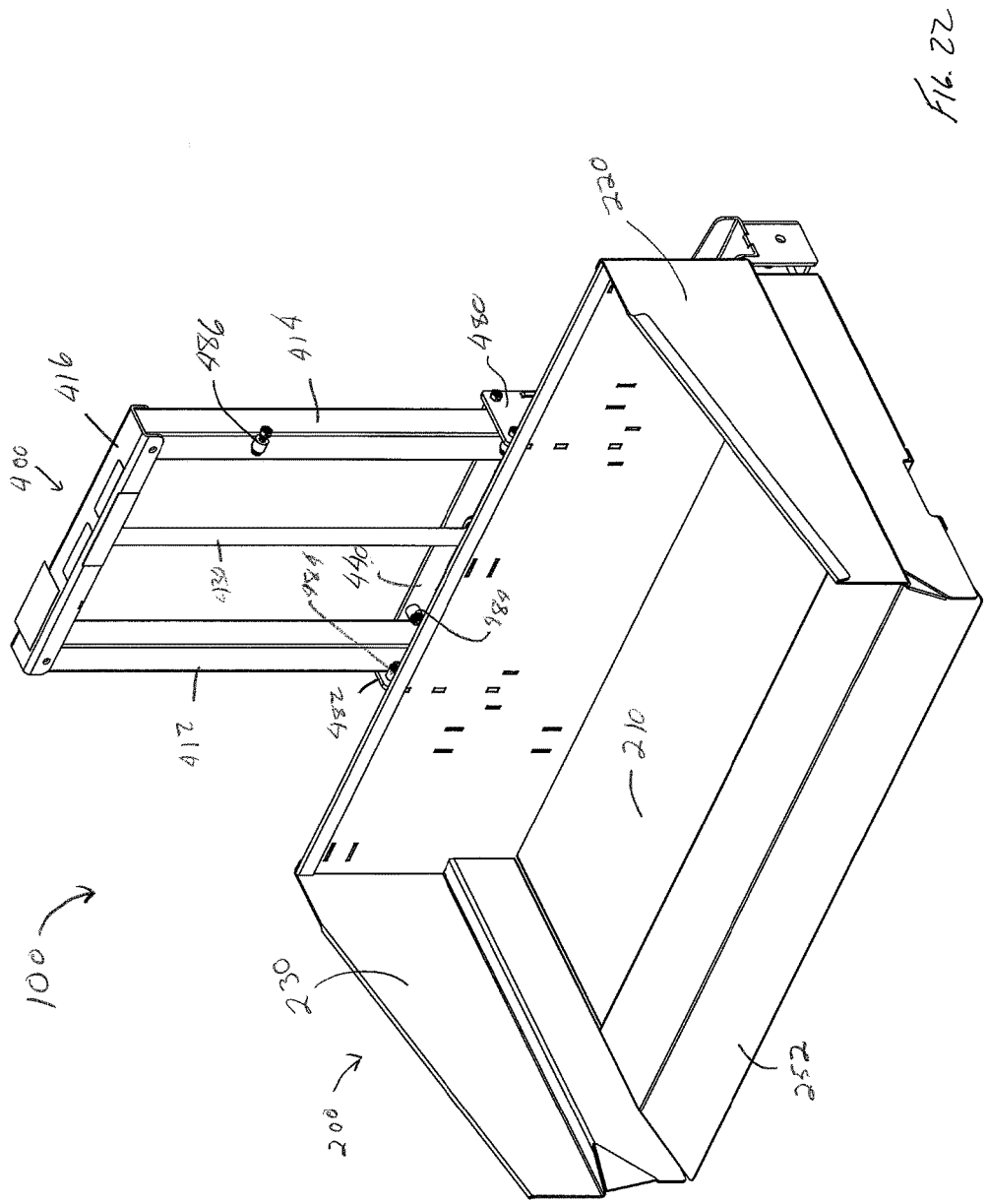

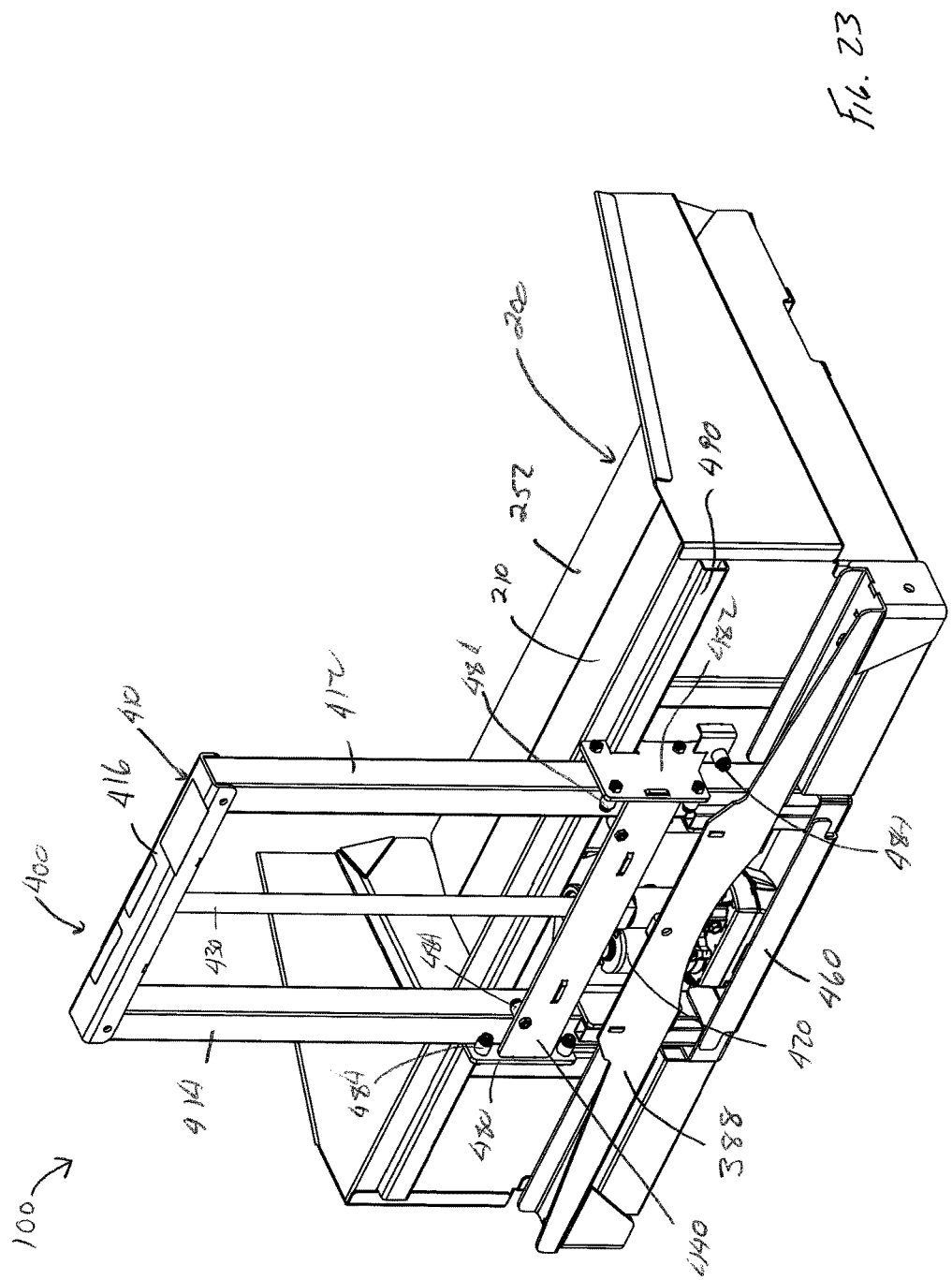

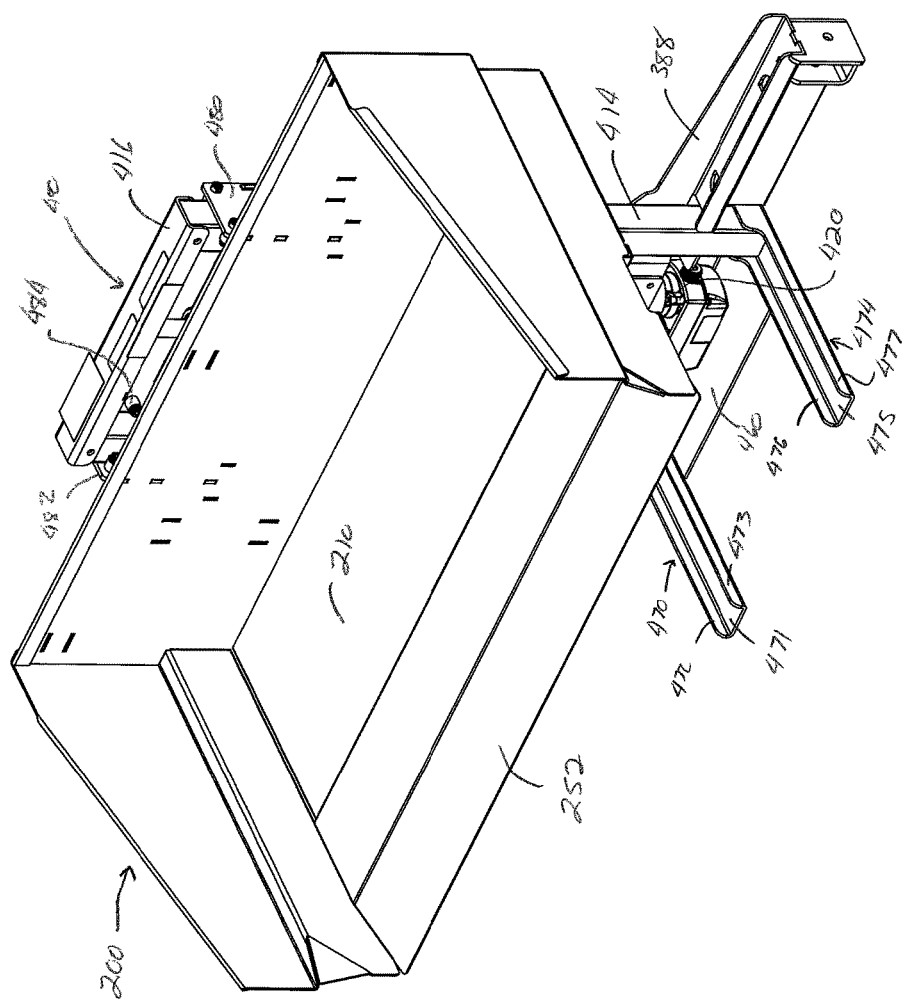

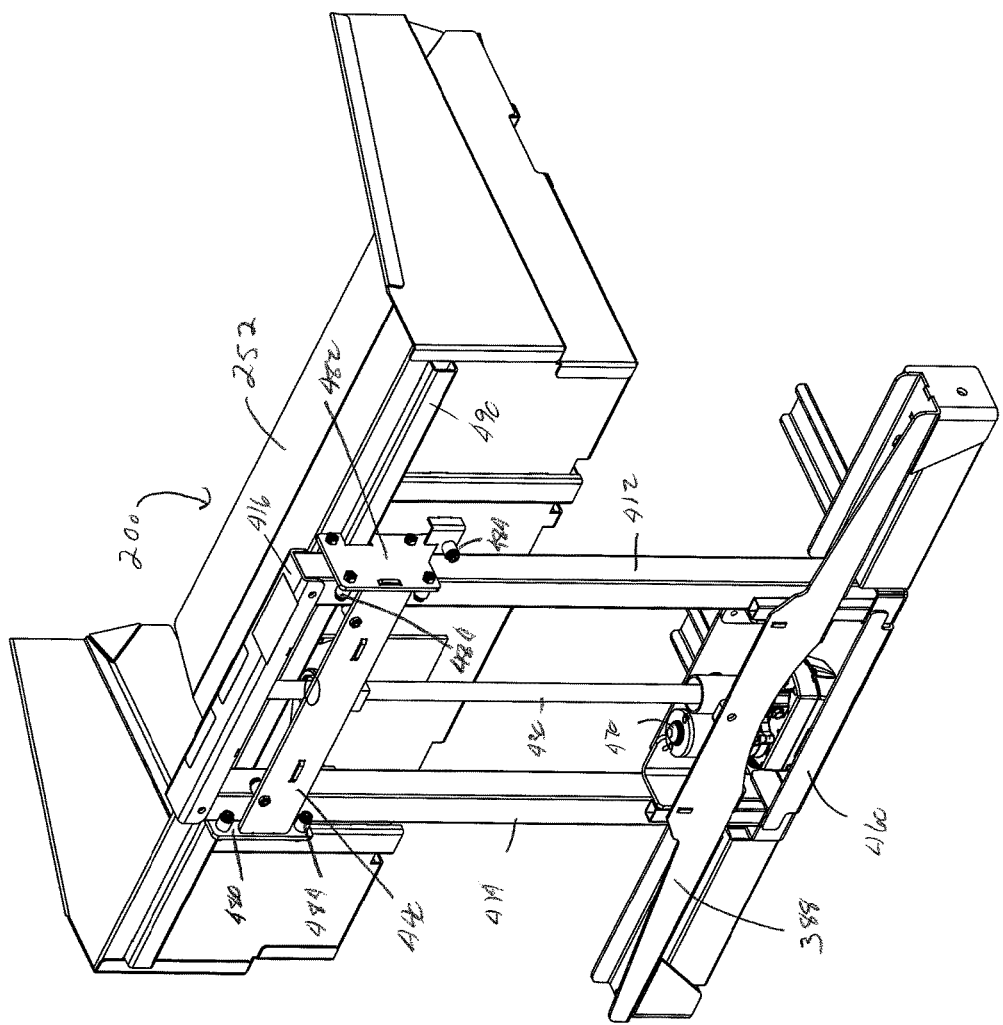

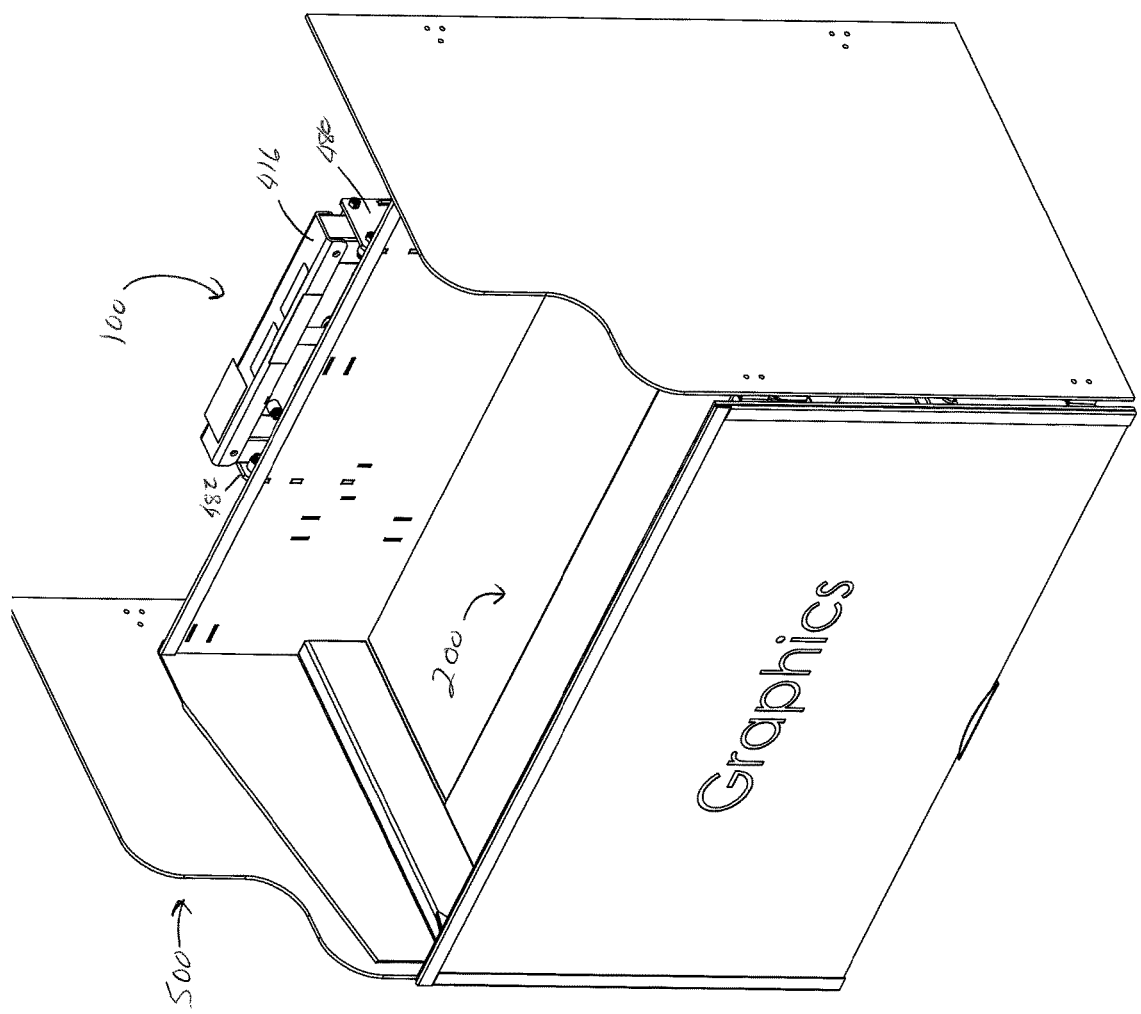

PALLET LIFTING SYSTEM

The present invention is a continuation in part of U.S. patent application Ser. No. 13/348,878 filed Jan. 12, 2012, which in turn claims priority on U.S. Provisional Application No. 61/432,431 filed Jan. 13, 2011, which are fully incorporated by reference.

The present invention also claims priority on U.S. Provisional Application No. 61/930,140 filed Jan. 22, 2014, which is fully incorporated by reference.

The present invention is directed to a lifting system, more particularly to a lifting that can be used as a product display system that can be advantageously used to display bulk goods, and even more particularly to a product or pallet lifting device that can be advantageously used to display bulk goods that are positioned on a pallet. The lifting system of the present invention can be used to controllably lift and/or lower a products, pallets, etc. The pallet generally includes one or more items on the top surface of the pallet; however, this is not required.

BACKGROUND OF THE INVENTION

It is common practice to sell goods by a pallet. Bulky goods such as, but not limited to, bags/cases of pet food, charcoal, bags of sand, bags of soil, bags of gravel, bags of pesticides, bags of salt, bags of fertilizers, bags of grass seed, bags/containers of cat litter, large bags of staple goods (i.e., flour, rice, sugar, beans, dried milk, etc.), cases of canned/bottled goods, cases of beverages, etc. are commonly sold to consumers while such bulky goods remain on the pallet. This manner of selling goods to consumers commonly occurs at warehouse or discount stores (e.g., Costco, Walmart, Marcs, BJ's, Sam's Club, Kmart, Pet Smart, Petco, Target, Lowes, Home Depot, Mennards, etc.); however, other types of stores may also sell goods to consumers while the goods remain on a pallet. Commonly, these pallets of goods are placed on the floor of a store and consumers merely grab a bag/bottle/container of the goods from the pallet of goods. Some retailers attempt to hide the generally unsightly pallet by placing a frame or display about the pallet. These displays are generally 24-40 inches high and include three or four sides to encircle the pallet. As can be appreciated, the shape, number of sides, height, etc. of such displays are non-limiting. The display frame may also include advertising that provides information about the goods that are stacked on the pallet; however, this is not required. As the number of the bags of goods on the pallet decreases, the height of the stacked goods decreases until eventually the top layer of the bag/bottle/container, etc. of the goods is on the top surface of the pallet. For bulky and heavy goods, it is generally undesirable to have to reach down and lift a bag off of the pallet. Also, when the top bag/bottle/container of the goods is located below the top edge of the display frame, the bag/bottle/container of the goods must be lifted over the edge of the display frame to remove the bag/bottle/container of the goods from the pallet of goods. Also, when the top bag/bottle/container of the goods is located below the top edge of the display frame, the display looks empty from a distance, thus may result in lost sales.

In an attempt to address the issue of having to lift the top bag/bottle/container of the goods over the edge of the display frame and/or the top bag/bottle/container of the goods being hidden by the top edge of the display frame, coiled spring pallet lifters have been developed. These coiled spring pallet lifters are designed to be in the fully raised/extended position when a certain low weight threshold exists on the top surface of the coiled spring pallet lifter. In practice, a pallet of goods is placed on the coiled spring pallet lifter, which results in the coiled spring(s) being compressed by the weight of the pallet. A separate truck or hydraulic pallet lifter is required to lift the pallet of goods onto the top surface of the coiled spring pallet lifter, which height of the top surface of the coiled spring pallet lifter is about 20-40 inches when the coiled spring pallet lifter is in the fully raised/extended position. As can be appreciated, the top surface of the coiled spring pallet lifter when in the fully raised/extended position can be less than or greater than 20-40 inches. Once the separate truck or hydraulic pallet lifter moves the pallet of goods over the top surface of the coiled spring pallet lifter, the pallet is then lowered onto the top surface of the coiled spring pallet lifter thereby causing the coiled spring(s) to be compressed by the weight of the pallet of goods. As the goods are removed from the pallet, the weight of the pallet of goods reduces until the weight is such that the coiled spring(s) of the coiled spring pallet lifter are able to counter the weight of the pallet of goods, thus lifting the pallet of goods. Although these coiled spring pallet lifters can be effective in raising pallets, such coiled spring pallet lifters are generally bulky, and require a truck or hydraulic pallet lifter to raise the pallet of goods onto the top surface of the coiled spring pallet lifter when the coiled spring pallet lifter is in the raised/extended position. Many retailers do not allow a truck or large hydraulic pallet lifter on the retail floor, thus allow only the hand-pulled pallet movers that only lift the pallet a few inches off of a floor surface. Such hand-pulled pallet movers do not and cannot raise a pallet high enough for loading the pallet of goods on a standard coiled spring pallet lifter when in the raised/extended position.

In view of the current state of the art of pallet risers for displaying goods to a consumer, there is a need for a pallet riser that can be easily loaded with a pallet of goods without the need of large pallet lifters and which can controllably lift and lower a pallet of goods at a designated and controllable height.

SUMMARY OF THE INVENTION

The pallet lifter of the present invention overcomes the past problems discussed above. The pallet lifter is designed so that the top support surface can be manually or mechanically raised and lowered to be only a few inches above a floor surface so that a hand-pulled pallet mover can easily load the pallet of goods onto the top support surface of the pallet lifter of the present invention. Although the pallet lifter is designed for use with a pallet, it will be appreciated that the pallet lift can be used to lift other types of items (e.g., bags, boxes, containers, individual items, etc.). As such, although the pallet lifter of the present invention will be described with particular reference for use with pallets, the pallet lifter of the present invention is not limited to the lifting of pallets.

In one non-limiting embodiment of the invention, the pallet lifter of the present invention includes a pallet platform, a lifting frame designed to raise and lower the pallet platform, and a movement mechanism designed to cause the lifting frame to move between an elevated or raised position and non-elevated position. The materials used to form one or more components of the pallet lifter of the present invention are non-limiting. Generally, the pallet lifter of the present invention is formed of durable materials (e.g., metal, wood, plastic, composite materials, etc.); however, this is not required. The color, size, and configuration of one or more components of the pallet lifter of the present invention are non-limiting.

In another and/or additional non-limiting embodiment of the invention, the pallet platform can have a variety of shapes, configurations and sizes. In one non-limiting configuration, the top surface of the pallet platform has a generally square or rectangular shape; however, it can be appreciated that the top surface can have other configurations (e.g., circular, oval, polygonal, etc.). Generally, the top surface of the pallet platform has a surface area and shape that can accommodate the dimensions of commonly sized pallets; however, this is not required. In one non-limiting configuration, the top surface of the pallet platform has a generally rectangular or square shape and a width of about 15-50 inches and a length of about 10-50 inches. As can be appreciated, the pallet lifter of the present invention can be customized for use with different sized pallets; however, this is not required. The pallet platform can optionally include one or more side walls and/or a back wall to facilitate in positioning and/or maintaining a pallet on the top surface of the pallet platform; however, this is not required. The height and/or thickness of the wall are non-limiting. The height of two or more walls (when used) can be the same or different. The pallet platform can optionally include a front loading lip to facilitate in the loading and/or unloading of the pallet from the top surface of the pallet platform. The front loading lip (when used) functions as a transition or ramp between a floor surface and the top surface of the pallet platform. In one non-limiting arrangement, the front edge of the top surface of the front loading lip is positioned closer to a floor surface than the rear edge of the top surface of the front loading lip when the front loading lip is positioned in a loading position; however, this is not required. The shape, size, and thickness of the front loading lip are non-limiting. The front loading lip (when used) can be designed to pivot and/or be movable between a loading position and a retaining position; however, this is not required. When the front loading lip is designed to pivot and/or be movable between a loading position and a retaining position, the front loading lip, when moved to the retaining position, can function as a front wall of the pallet platform to retain a pallet on the top surface of the pallet platform; however, this is not required. The top surface of the pallet platform can optionally include one or more surfaces that inhibit or prevent the sliding of the pallet on the top surface of the pallet platform. Non-limiting surfaces includes a rubber surface, a non-smooth surface, a compressible surface, etc. The pallet platform can optionally include a securing arrangement that is designed to releasably secure a pallet or other item on the top surface of the pallet. Non-limiting examples of such a securing arrangement includes clips, latches, hooks, wire, rope, etc. The base of the pallet platform can optionally include one or more removable and/or movable boards or planks that can be used to provide support to the pallet or other item on the pallet platform.

In still another and/or additional non-limiting embodiment of the invention, the lifting frame can have a variety of shapes, configurations and sizes. In one non-limiting arrangement, the lifting frame includes one or more sets of legs that can move relative to one another to enable the lifting frame to move between a fully lower or loading position and a fully upper or fully raised position. The one or more sets of legs can be connected to different regions on the pallet platform (e.g., left side, right side, front side, rear side, bottom surface, top surface, side wall, rear wall, etc.). The one or more sets of legs can include two or more legs. The two or more legs can be connected together so that the two or more legs can pivot or rotate relative to one another; however, this is not required. The lifting frame can include one or more stability or rigidity structures (e.g., reinforcement bars, etc.) to provide stability, strength and/or rigidity to the lifting frame; however, this is not required. The lifting frame can include a top frame structure; however, this is not required. When the lifting frame includes a top frame structure, the one or more sets of legs are connected to and/or moveable on the top frame structure and the top frame structure is connected to the pallet platform; however, this is not required. The top frame structure (when used) can provide stability, strength and/or rigidity to the lifting frame; however, this is not required. The top frame structure can optionally include a guide slot and/or track that enable the end of one or more legs to move in the guide slot and/or track as the lifting frame moves between a fully lower or loading position and a fully upper or fully raised position. When the end of one or more legs is designed to move in the guide slot and/or track, the one or more ends generally includes a wheel, roller, skid, etc. to facilitate in the movement of the end in the guide slot and/or track; however, this is not required. The lifting frame can include a bottom frame structure; however, this is not required. When the lifting frame includes a bottom frame structure, the bottom frame structure is generally designed to rest on a floor surface; however, this is not required. The one or more sets of legs can be connected to the bottom frame structure and/or moveable on the bottom frame; however, this is not required. The bottom frame structure (when used) can provide stability, strength and/or rigidity to the lifting frame; however, this is not required. The bottom frame structure can optionally include a guide slot and/or track that enable the end of one or more legs to move in the guide slot and/or track as the lifting frame moves between a fully lower or loading position and a fully upper or fully raised position. The bottom frame structure can include one or more stability or rigidity structures (e.g., reinforcement bars, etc.) to provide stability, strength and/or rigidity to the bottom frame structure; however, this is not required. The bottom frame structure can optionally include one or more wheels, slides and/or skids to facilitate in the movement of the lift frame on a floor surface. The front, rear and/or side of the lifting frame can optionally include one or more wheels or rollers or slides or skids to enable a bottom portion of one or more legs to move on or relative to a floor surface as the lifting frame moves between a fully lower or loading position and a fully upper or fully raised position; however, this is not required. In one non-limiting arrangement, the lifting frame includes two sets of legs on each side of the lifting frame. Each set of legs includes two legs that are optionally connected together to enable the connected legs to rotate or pivot relative to one another. The first leg and/or the second leg on each set of legs can be connected together by one or more stability or rigidity structures. The first end of the leg on each set of legs that is positioned at or closer to the front end of the lifting frame can include a wheel or roller. The lifting frame can include a top frame structure wherein the second end of one or both of the legs of each set of legs can move along a portion of the top frame as the lifting frame moves between a fully lower or loading position and a fully upper or fully raised position. The top frame structure can have a configuration that guides the movement of the second end of one or both of the legs of each set of legs as the one or both legs move as the lifting frame moves between a fully lower or loading position and a fully upper or fully raised position. In another non-limiting arrangement, the lifting frame does not include the use of movable legs that are used to lift and lower the pallet platform.

In yet another and/or additional non-limiting embodiment of the invention, the movement mechanism can have a variety of shapes, configurations and sizes. In one non-limiting arrangement, the movement mechanism is optionally connected to the top frame structure of the lifting frame and/or to the pallet platform and lifts and lowers the top frame structure of the lifting frame and/or to the pallet platform to cause the lifting frame to move between a fully lower or loading position and a fully upper or fully raised position. In such an arrangement, the movement mechanism can optionally not be connected to the one or more sets of legs of the lifting frame. In another non-limiting arrangement the movement mechanism is optionally connected to the one or more sets of legs of the lifting frame and causes one or more of the legs to move to thereby cause the lifting frame to move between a fully lower or loading position and a fully upper or fully raised position. In such an arrangement, the movement mechanism can optionally not be connected to the top frame structure. The movement mechanism generally includes one or more motors; however, this is not required. The type of motor (when used) is non-limiting. When the motor is used, the motor is generally an electric motor; however, combustion and/or hydraulic motors can optionally be used. When an electric motor is used, the electric motor can be battery powered; however, it can be appreciated that one or more electric motors can be also or alternatively be powered by solar energy, fuel cell, electricity from a power outlet and/or by an electric generator, etc. The motor can be designed to cause a rod or shaft to move (e.g., rotate, reciprocate, etc.) to thereby cause the lifting frame to move between a fully lower or loading position and a fully upper or fully raised position; however, this is not required. The rod or shaft (when used) can be a threaded shaft; however, this is not required. In one non-limiting arrangement, the movement mechanism is designed to pull together and push apart two or more legs on one or more sets of legs to cause the lifting frame to move between a fully lower or loading position and a fully upper or fully raised position. In another non-limiting arrangement, the movement mechanism is designed to be connected to the top frame structure of the lifting frame and/or to the pallet platform and thereby lifts and lowers the top frame and/or pallet platform to cause the lifting frame to move between a fully lower or loading position and a fully upper or fully raised position.

In still yet another and/or additional non-limiting embodiment of the invention, the pallet lifter can optionally include one or more height sensors that are used to control a height of the pallet platform. The type of sensor used in the height sensor is non-limiting (e.g., optical sensor, IR sensor, sound wave sensor, electromagnetic wave sensor, tactile sensor, etc.). The height sensor (when used) can be designed to monitor the current height of goods on the pallet (if any) and can cause the lifting frame to raise and/or lower based on the detected height. Such a feature can be beneficial in that the desired level of the top layer of goods on the pallet can be maintained to enhance the display of the products to consumers. The one or more height sensors can optionally be housed in a protective housing to protect the height sensors from damage. The size, shape and configuration of the protective housing are non-limiting.

In another and/or additional non-limiting embodiment of the invention, the pallet lifter can optionally include a display frame that partially or fully encircles the lifting frame. The display frame can optionally include printed matter that provides information about the product on the pallet positioned in the pallet lifter and/or some other type of information. The display frame (when used) can be optionally connected to the lifting frame.

In still another and/or additional non-limiting embodiment of the invention, the pallet lifter can optionally include one or more counter weights, gas springs, mechanical springs or the like to partially or fully counter the weight of the pallet platform, the weight of the pallet on the pallet platform and/or the weight of items on the pallet that is positioned on the pallet platform.

It is one non-limiting objective of the present invention to provide a pallet lifter that is compact and easy to use.

It is another and/or alternative non-limiting objective of the present invention to provide a pallet lifter that enables a pallet to be easily loaded and unloaded onto/from the pallet lifter.

It is still another and/or alternative non-limiting objective of the present invention to provide a pallet lifter that enables a pallet to be easily loaded and unloaded onto/from the pallet lifter by a hand-pulled pallet mover.

It is yet another and/or alternative non-limiting objective of the present invention to provide a pallet lifter that includes a ramp or lip to enable a pallet or pallet mover to be easily positioned on a top surface of the pallet platform of the pallet lifter.

It is still yet another and/or alternative non-limiting objective of the present invention to provide a pallet lifter that includes a motorized movement mechanism that causes the lifting frame to move between a fully lower or loading position and a fully upper or fully raised position.

It is another and/or alternative non-limiting objective of the present invention to provide a pallet lifter that includes a height sensor that is used to control the height of the pallet platform of the pallet lifter.

It is still another and/or alternative non-limiting objective of the present invention to provide a pallet lifter that includes a display frame that partially or fully encircles the lifting frame of the pallet lifter.

It is yet another and/or alternative non-limiting objective of the present invention to provide a pallet lifter that includes a movement mechanism that can controllably increase and/or reduce the height of the pallet platform of the pallet lifter.

It is still yet another and/or alternative non-limiting objective of the present invention to provide a pallet lifter that is more compact in size, lighter in weight, and/or has a simpler design than prior art pallet risers.

These and other objectives and advantages will become apparent to those skilled in the art upon reading and following the description taken together with the accompanying drawings.

BRIEF DESCRIPTION OF THE DRAWINGS

Reference may now be made to the drawings which illustrate various preferred embodiments that the invention may take in physical form and in certain parts and arrangement of parts wherein:

FIG. 16 is a rear elevation view of the pallet lifter of FIG. 15;

FIG. 17 is a front elevation view of the pallet lifter of FIG. 15 wherein the pallet platform is in the fully upper or fully raised position;

FIG. 18 is a rear elevation view of the pallet lifter of FIG. 17;

FIG. 19 is a front elevation view of the pallet lifter of FIG. 17 and includes an assembled screen positioned about the frame of the pallet lifter;

FIG. 20 is an enlarged view of the top section of the pallet lifter of FIG. 17 that includes a height sensor;

FIG. 21 is an exploded view of the a height sensor;

FIG. 22 is a front elevation view of another non-limiting configuration of the pallet lifter in accordance with the present invention wherein the pallet platform is in the fully lower or loading position;

FIG. 23 is a rear elevation view of the pallet lifter of FIG. 22;

FIG. 24 is front elevation view of the pallet lifter of FIG. 22 wherein the pallet platform is in the fully upper or fully raised position;

FIG. 25 is a rear elevation view of the pallet lifter of FIG. 24; and,

FIG. 26 is a front elevation view of the pallet lifter of FIG. 24 and includes an assembled screen positioned about the frame of the pallet lifter.

DETAILED DESCRIPTION OF ONE NON-LIMITING EMBODIMENT

Figure 1:
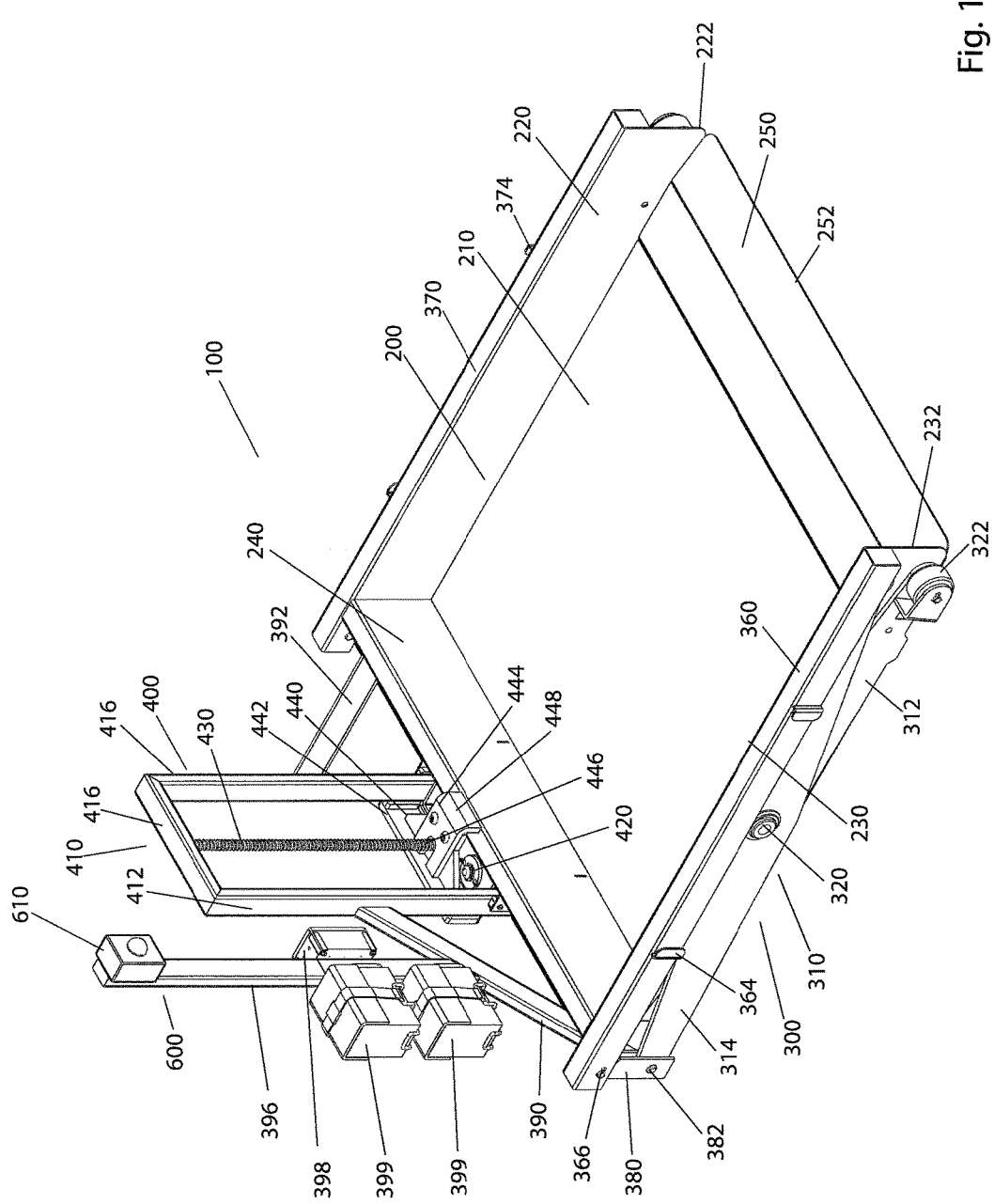
FIG. 1 is a front elevation view of one non-limiting configuration of the pallet lifter in accordance with the present invention wherein the pallet platform is in the fully lower or loading position.

Referring now to the drawings wherein the showings are for the purpose of illustrating one non-limiting embodiment of the invention only and not for the purpose of limiting same, FIGS. 1-25 illustrate one non-limiting embodiment of a pallet lifter in accordance with the present invention. The pallet lifter is designed so that a pallet platform can be raised and lowered. The pallet lifter includes a movement mechanism that controllably causes the pallet platform to raise and lower. The pallet lifter can optionally include a display frame that is fully or partially positioned about the lifting frame of the pallet lifter. The pallet lifter can optionally include a height sensor arrangement that senses 1) one or more surfaces on a pallet on the pallet platform, 2) one or more surfaces of the pallet platform, and/or 3) one or more surfaces of items that are positioned on the pallet that is positioned on the pallet platform. The pallet lifter of the present invention is designed to overcome the past deficiencies of prior art pallet risers. The pallet lifter of the present invention is 1) compact, 2) portable, 3) easy to operate, and 4) easy to load and unload.

Referring now to FIGS. 1-14, there is illustrated a pallet lifter 100 that includes pallet platform 200 and can be raised and lowered by a movement mechanism 400. The pallet lifter includes a lifting frame 300 used to support the pallet platform. As illustrated in FIGS. 1, 3, 5, 6, 9-14, the pallet lifter 100 has a pallet platform 200 that is designed to partially or fully support a pallet (not shown). Many different sized pallets exist. As such, the pallet platform can be designed to many different dimensions. For example, the pallet platform can be designed to receive a pallet having a 40 inch width and a 48 inch length. For such a pallet, the top surface 210 of the pallet platform generally has a width that is equal to or greater than the width of the pallet. For a pallet platform designed to receive a 40 inch width pallet, the top surface of the pallet platform has a width of about 100%-120% the width of the pallet (i.e., 40-48 inches), typically about 102%-115% the width of the pallet (i.e., 40.8-46 inches), and more typically about 105%-110% the width of the pallet (i.e., 42-44 inches). The top surface of the pallet platform generally has a length that is less, equal to or greater than the length of the pallet. For a pallet platform designed to receive a 48 inch length pallet, the top surface of the pallet platform has a length of about 75%-120% the length of the pallet (i.e., 36-57.6 inches), typically about 100%-115% the width of the pallet (i.e., 48-55.2 inches), more typically about 102%-115% the width of the pallet (i.e., 49-55.2 inches), and still more typically about 104%-110% the width of the pallet (i.e., 50-52.8 inches).

The top surface of the pallet platform can have a fixed or adjustable width and/or a fixed and/or adjustable length. The top surface of the pallet platform can be formed of a one piece continuous piece of material or be formed of multiple pieces. As illustrated in FIGS. 1, 3, 5, 6, 9-13, the top surface of the pallet platform is formed of one piece of material. For example, the top surface of the pallet platform can be a solid metal sheet of material. In another non-limiting example, the top surface of the pallet platform can be formed of a piece of wood (e.g., plywood, etc.) that is connected to the pallet platform and/or removably placed on a frame structure of the pallet platform. The type of connection, if used, is non-limiting (e.g., adhesive, bolts, rivets, clamps, screws, weld bead, etc.). As illustrated in FIG. 14, the top surface 210 of the pallet platform can be formed of multiple pieces. For example, the top surface of the pallet platform could be formed of four wood slats or metal pieces that are positioned on a ledge 211 on the pallet platform. The ledge (when used) can be located on the front and/or back, and/or on one or both sides of the pallet platform. The wood slats or metal pieces could be secured in position on the pallet platform and/or removably placed on the pallet platform. The type of connection, if used, is non-limiting (e.g., adhesive, bolts, rivets, clamps, screws, weld bead, solder, hook and loop fastener, etc.). The top surface of the pallet platform may or may not include one or more openings. As illustrated in FIG. 14, openings exist on the top surface of the pallet platform. The top surface generally has a square or rectangular shape. Generally, the top surface of the top support surface of the pallet platform lies in a flat uniform plane that is generally parallel to a ground surface; however, this is not required. The top surface of the top support surface can include gripping surfaces to facilitate in gripping the bottom of the pallet to the top surface when the pallet is placed on the top surface of the top support surface; however, this is not required. The top support surface can include a securing arrangement to secure the pallet to the top support surface; however, this is not required. The top surface of the top support surface can include rollers, skids, etc. to facilitate in the movement of the bottom of the pallet on the top surface when the pallet is placed on the top surface of the top support surface; however, this is not required. Generally, a majority of the top surface of the top support surface lies in a flat uniform plane that is generally parallel to a ground surface; however, this is not required.

The pallet platform can include one or more walls that extend upwardly from the top surface of the pallet platform. As illustrated in FIGS. 1, 3, 5, 6, 9, 10, 13 and 14, the pallet platform 200 includes two side walls 220, 230 and a back wall 240. The height of the walls can be the same or different. All of the walls are illustrated as being positioned at the peripheral edges of the top surface; however, this is not required. All of the walls are illustrated as being normal to the top surface of the pallet platform; however, this is not required. The walls (when used) facilitate in maintaining and positioning the pallet on the top surface of the pallet platform.

A ramp or lip 250 is illustrated as being connected to the front edge of the top surface. The ramp or lip is optional. When the ramp or lip is used, the ramp or lip facilitates in positioning a pallet onto the top surface of the pallet platform. The lip or ramp can be used to enable the wheels of a pallet ramp loader to roll partially or fully up the ramp or lip when loading or removing a pallet from the top surface of the pallet platform. Generally, the top surface of the pallet platform is 0.5-5 inches above a ground surface when the pallet platform is in the fully lowered position. The lip or ramp (when used) facilitates in creating a transition for the pallet or pallet mover between the floor surface and the top surface of the pallet platform when the pallet platform is in the fully lowered position. The ramp or lip can be removably connected to the pallet platform; however, this is not required. The ramp or lip can be pivotally connected to the pallet platform; however, this is not required. When the ramp or lip is pivotally connected to the pallet platform, the ramp or lip can be raised to an upward position and secured in the upward position; however, this is not required. When the ramp or lip is in the upward position, the ramp or lip can function as a front wall to facilitate in maintaining a pallet on the top surface of the pallet platform; however, this is not required. As illustrated in FIGS. 1-3, 6, 7, 9, and 14, the front edge of the side walls 222, 232 extend to about the same distance as the front edge 252 of the ramp or lip; however, this is not required.

The lifting frame 300 includes two sets of legs 310, 340, and top frame structure 360, a bottom frame structure 380, and a reinforcement member 390. Each set of legs includes two legs (e.g., 312, 314, 342, 344). The two legs in each set of legs are connected together; however, this is not required. The connection 320, 350 can be any type of connection that enables the two connected legs to move relative to one another about the connection. As illustrated in FIGS. 1-3, 6, 7, 9, and 14, the connection is generally positioned at or near the mid-longitudinal region of the legs; however, this is not required. The two legs of each set of legs can have the same length, shape and configuration; however, this is not required. The mid-region of the legs is illustrated as having a greater width; however, this is not required. A wheel or roller 322, 332 is connected to the front end 313, 343 of legs 312, 342; however, this is not required. The wheels or rollers can have any shape, size and configuration. Alternatively, the front end 313, 343 of legs 312, 342 can include a skid or slide surface; however, this is not required. The means in which the roller or wheels are connected to the front ends of the legs is non-limiting. The wheels or rollers (or alternatively a skid or slide surface), when used, enable the front end of legs 312, 342 to move along a floor surface as the lifting frame moves between a fully upper or elevated or raised position and a fully lower or non-elevated or loading position. As can be appreciated, as the lifting frame moves from a non-elevated position to a raised position, the front end of legs 312, 342 move toward the back end 315, 345 of legs 314, 344. Likewise, as the lifting frame moves from an elevated or raised position to a non-elevated or lower position, the front end of legs 312, 342 move away from the back end 315, 345 of legs 314, 344. The wheels or roller facilitate in such movement of the legs over the floor surface.

Figure 2:
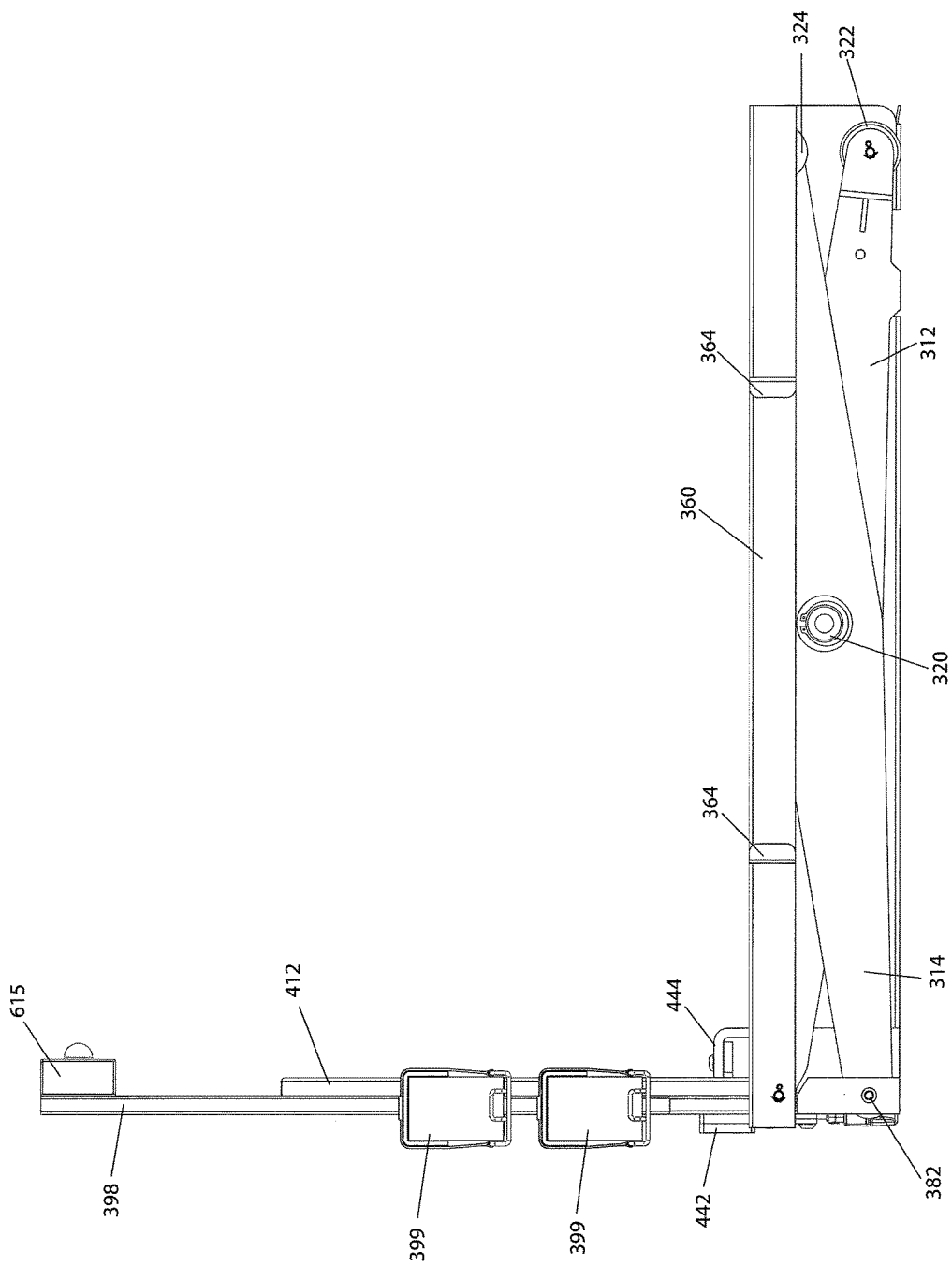
FIG. 2 is a side view of the pallet lifter of FIG. 1.
Figure 3:
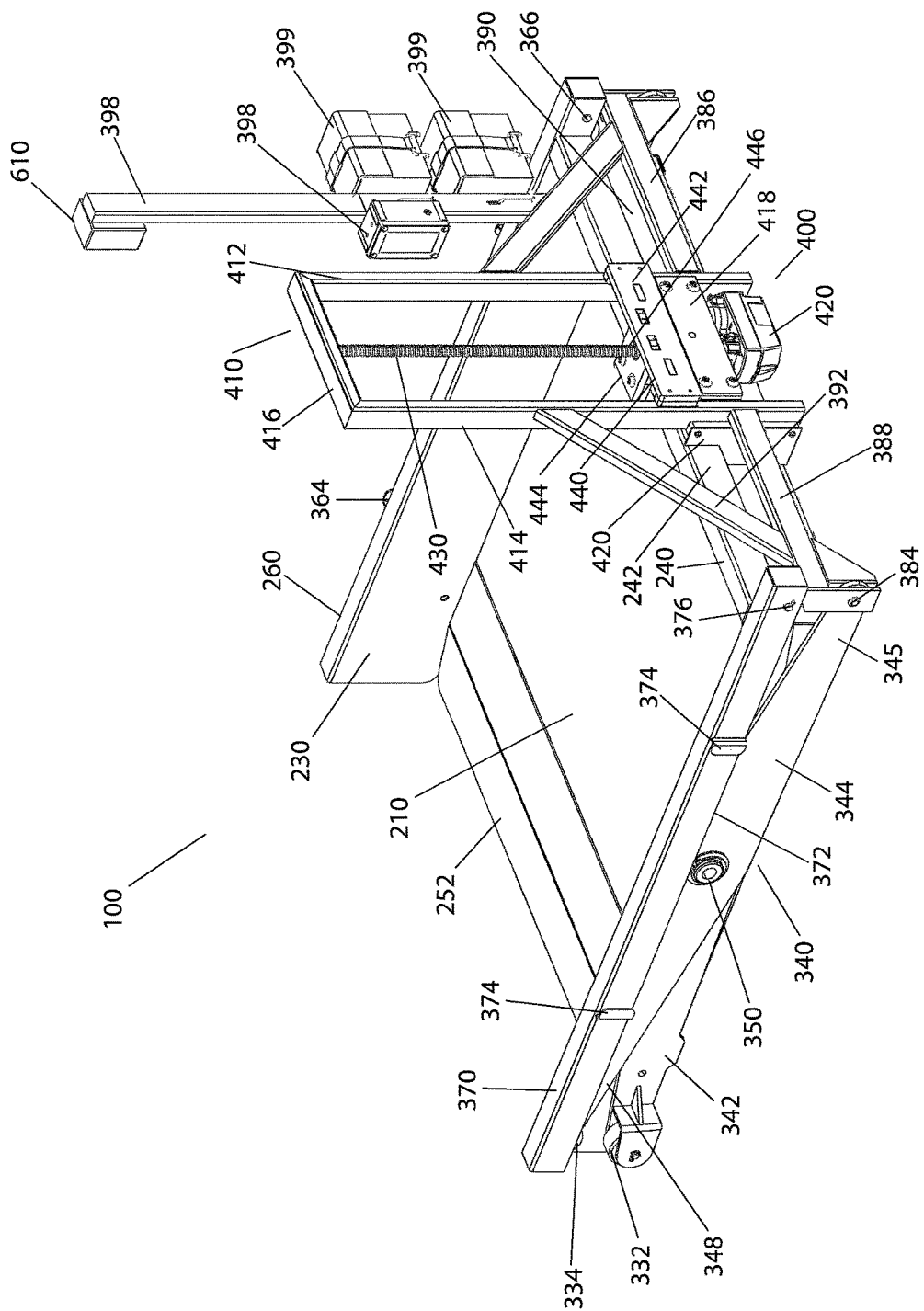
FIG. 3 is a back elevation view of the pallet lifter of FIG. 1.
Figure 4:
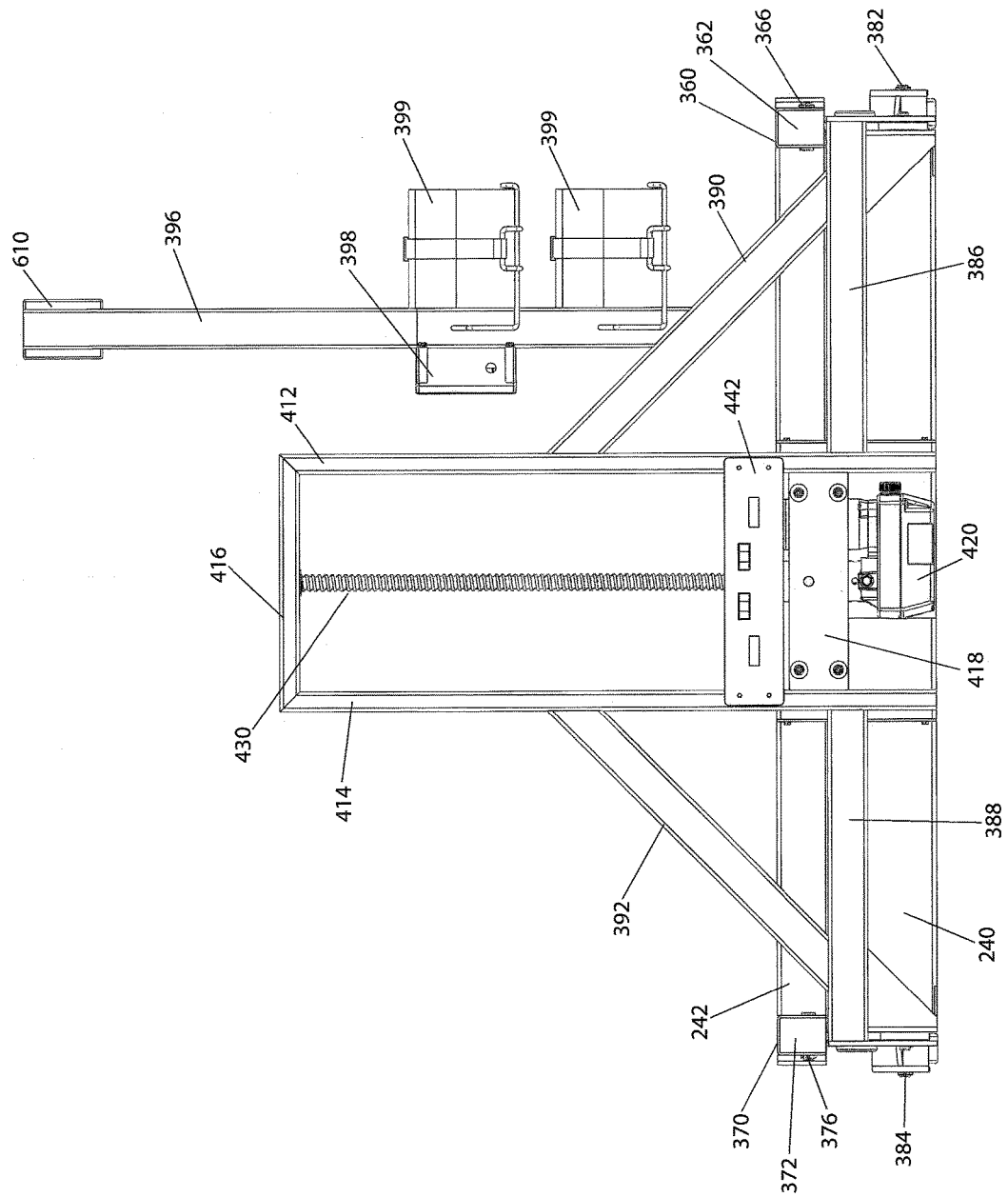
FIG. 4 is a back plan view of the pallet lifter of FIG. 1.
Figure 5:
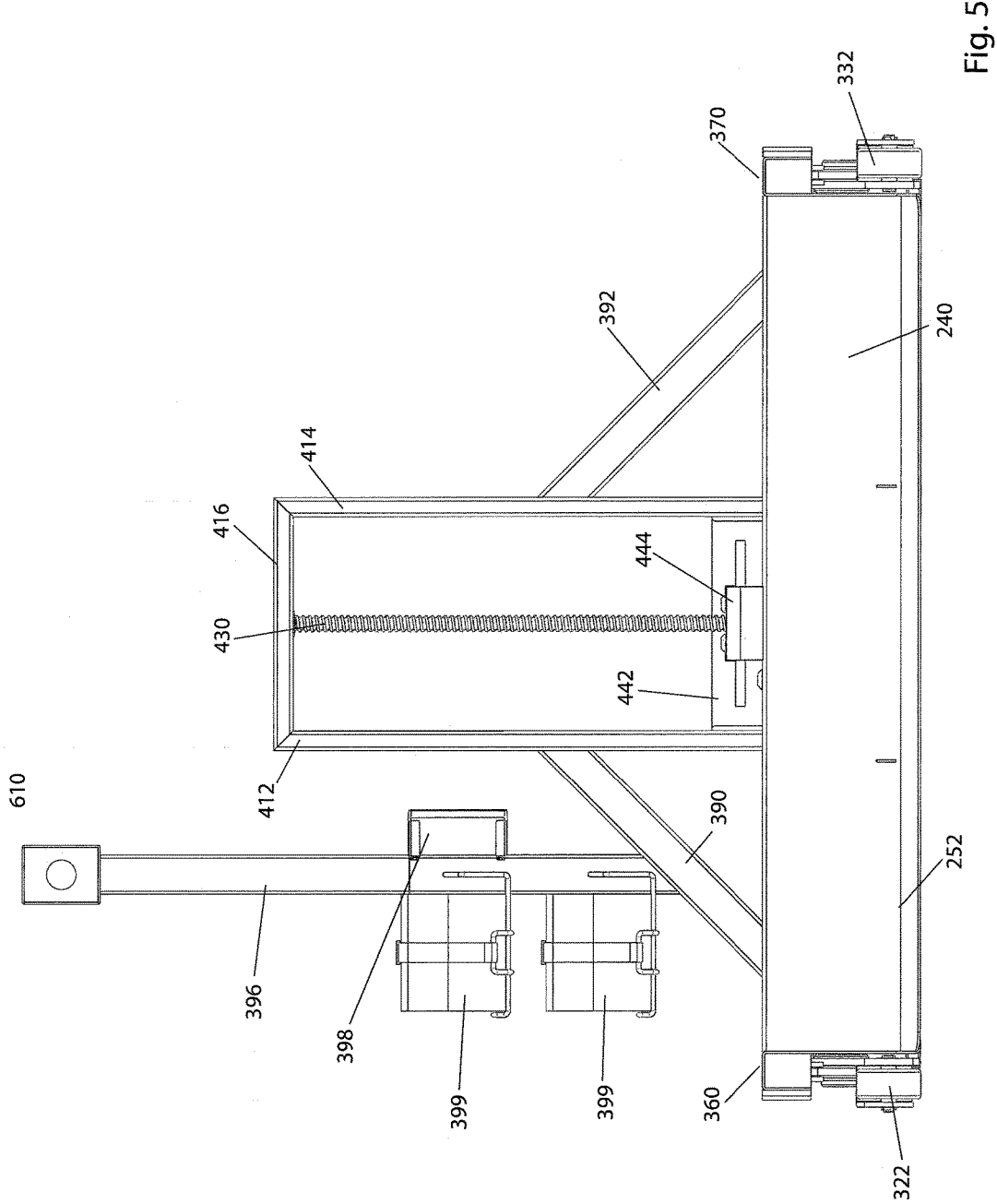
FIG. 5 is a front plan view of the pallet lifter of FIG. 1.
Figure 6:
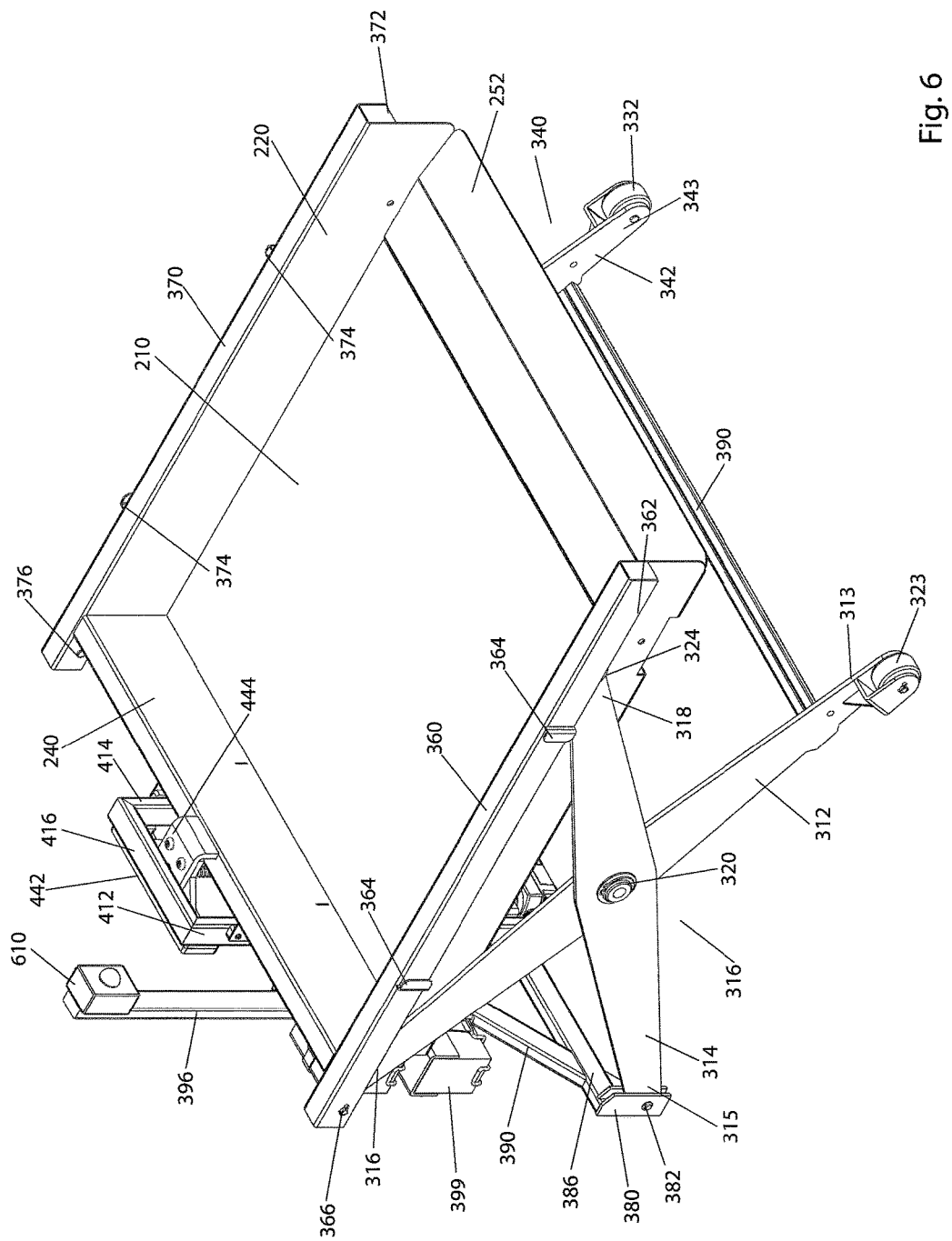
FIG. 6 is a front elevation view of the pallet lifter of FIG. 1 wherein the pallet platform is in the fully upper or fully raised position.
Figure 7:
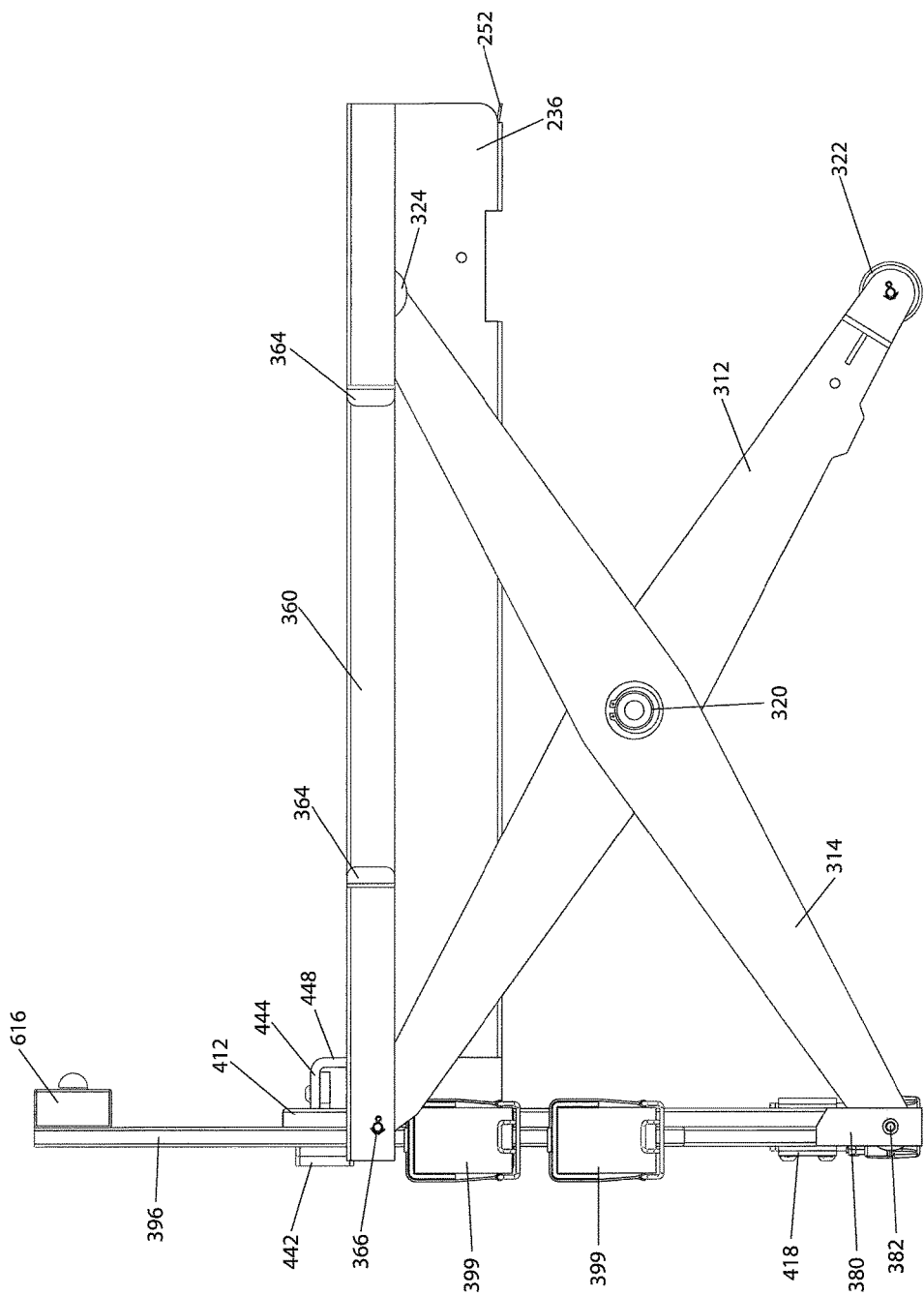
FIG. 7 is a side view of the pallet lifter of FIG. 6.
Figure 8:
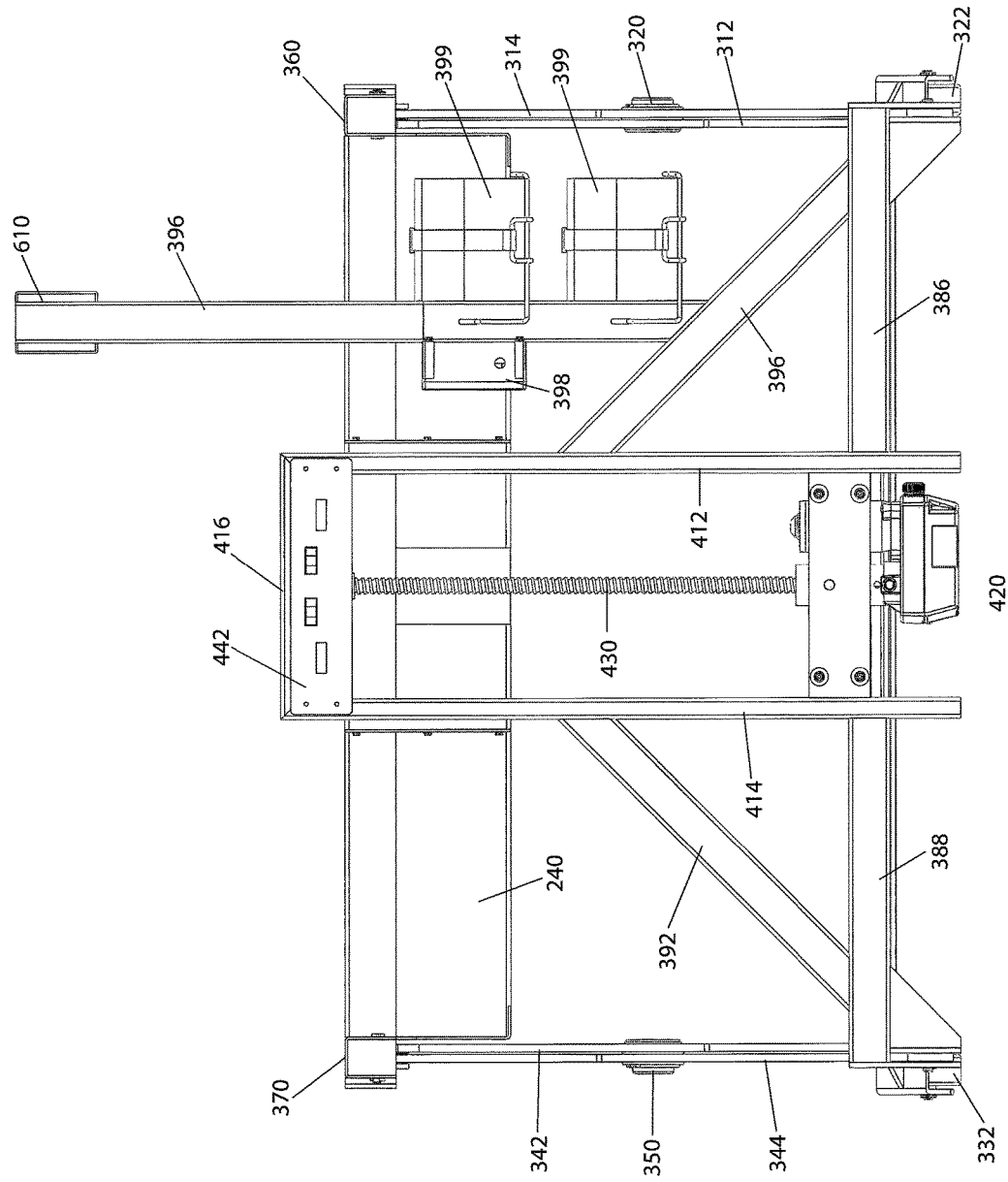
FIG. 8 is a back plan view of the pallet lifter of FIG. 6.
Figure 9:
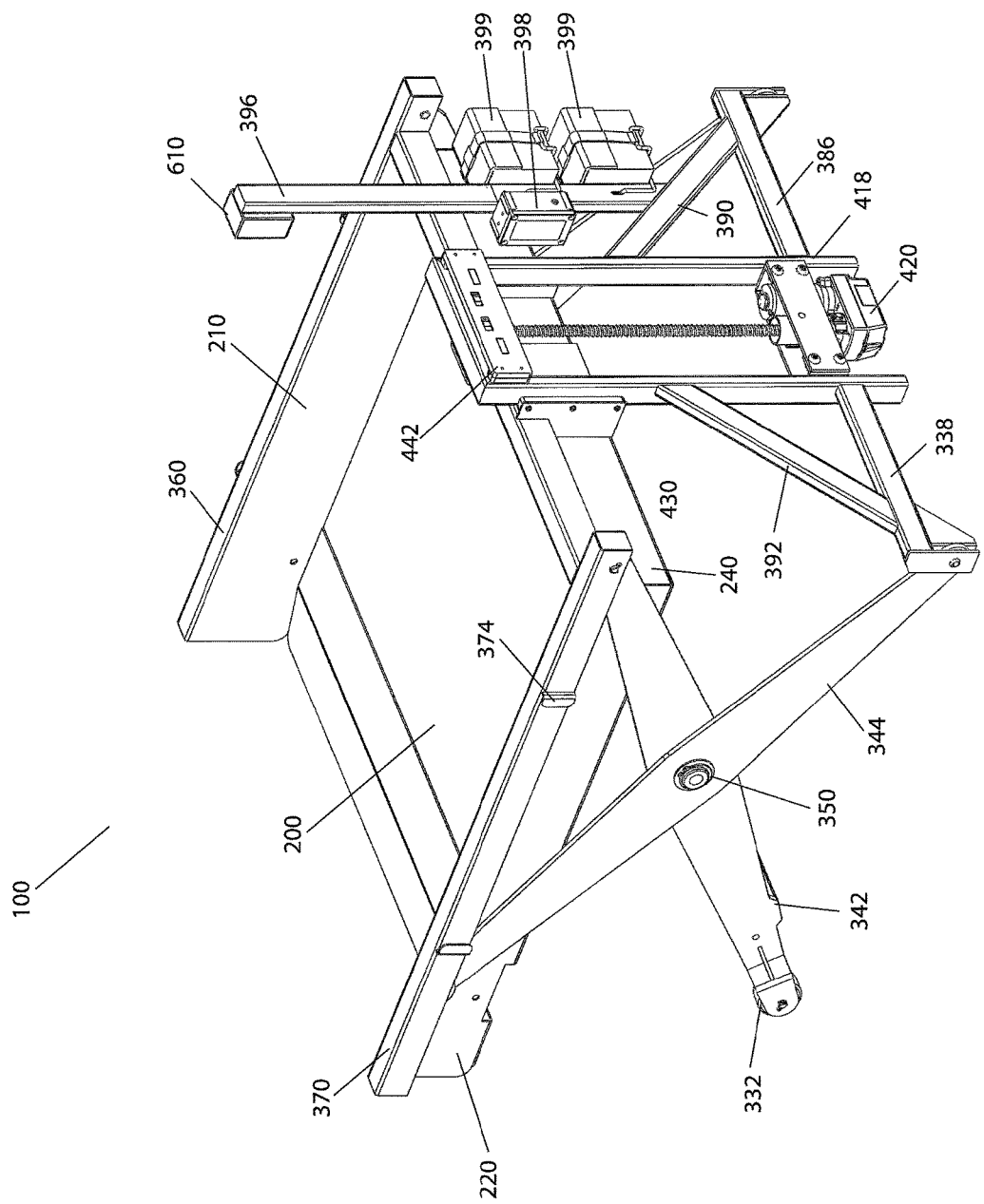
FIG. 9 is a back elevation view of the pallet lifter of FIG. 6.
Figure 10:
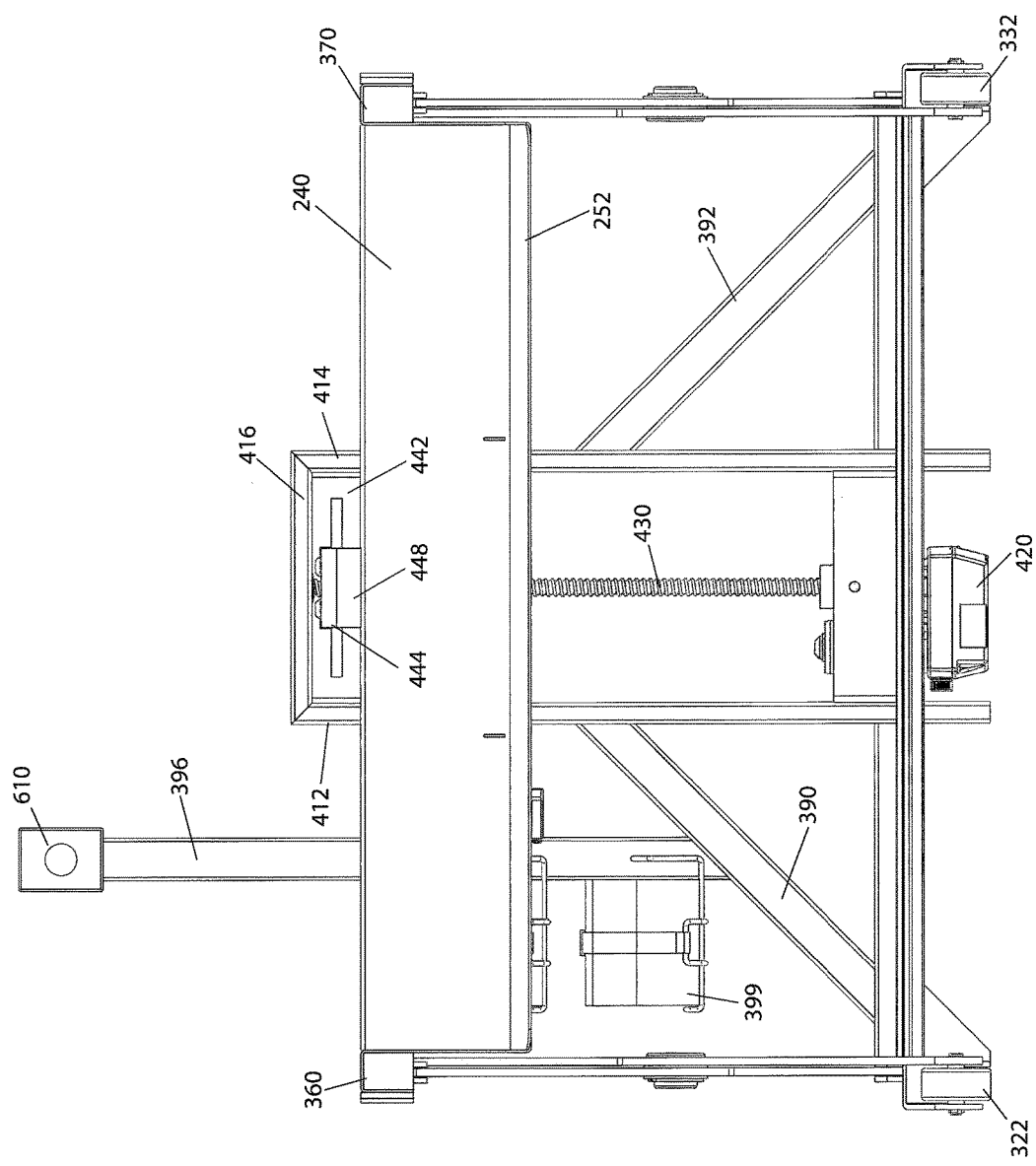
FIG. 10 is a front plan view of the pallet lifter of FIG. 6.

As illustrated in FIGS. 1-3, the length of legs 312, 342 is selected such that the front ends of the legs do not extend past the front edge of the side walls when the lifting frame is in the fully non-elevated or lower position; however, this is not required.

A reinforcement member 390 is illustrated as being connected between legs 312, 342; however, this is not required. The reinforcement structures provide strength and rigidity to the lifting frame. The size, shape, material and configuration of the reinforcement member are non-limiting. The number of reinforcement members used is non-limiting.

The back ends 316, 346 of legs 312, 342 are connected to top frame structure 360, 370 by a connector 366, 376; however, this is not required. The type of connection between the back end of the legs and the top frame structure is non-limiting. Generally, the back ends 316, 346 of legs 312, 342 are hingedly connected to top frame structure 360, 370; however, this is not required. The front ends 318, 348 of legs 314, 344 include a wheel or roller 324, 334; however, this is not required. The wheels or rollers can have any shape, size, material and configuration. The means in which the roller or wheels are connected to the front ends of the legs is non-limiting. The wheels or rollers, when used, enable the front end of legs 314, 344 to move along a wheel slot 362, 372 in the top frame structure 360, 370. The configuration of the wheel slot is non-limiting. As illustrated in FIGS. 1-3, 6, 7, and 9, a majority of the wheel or roller 324, 334 is positioned in wheel slot 362, 372 in the top frame structure 360, 370; however, this is not required. The wheel slot can be designed to maintain the wheel in the respective wheel slot as the pallet platform is raised and lowered; however, this is not required. As can be appreciated, as the lifting frame moves from a non-elevated position to a raised position, the front end of legs 314, 344 move toward the back end 316, 346 of legs 312, 342. Likewise, as the lifting frame moves from an elevated or raised position to a non-elevated or lower position, the front end of legs 314, 344 move away from the back end 316, 346 of legs 312, 342. The wheels or rollers facilitate in such movement of the legs in the wheel slot in the top frame structure 360, 370. As can be appreciated, the front end of legs 314, 344 can be connected to top frame structure 360, 370 and the back end 316, 346 of legs 312, 342 can be designed to move in the wheel slot in the top frame structure 360, 370; however, this is not required.

The top frame structure 360, 370 is illustrated in FIGS. 1, 3, 4-6, 8-10 and 14 as being connected to the pallet platform. The location of the connection and the type of connection is non-limiting (e.g., weld bead, solder, adhesive, bolt, screw, rivet, etc.). As illustrated in FIGS. 1, 3, 4-6, 8-10 and 14, top frame structures 360, 370 are connected to side walls 220, 230; however, it can be appreciated that the top frame structures 360, 370 can be connected to other or additional locations on the pallet platform.

The top frame structures 360, 370 can optionally include panel connectors 364, 374 for display frame 500; however, this is not required. The size, type, material and configuration of the panel connectors 364, 374 are non-limiting. Two panel connectors are illustrated on top frame structures 360, 370; however, it can be appreciated that only one or more than two panel connectors can be located on top frame structure 360, 370.

Referring now to FIGS. 1-3, 6, 7, 9 and 14, the back end 315, 345 of legs 314, 344 are connected to bottom frame structure 380 by a connector 382, 384; however, this is not required. The type of connection between the back end of the legs and the top frame structure is non-limiting. Generally, the back end 315, 345 of legs 314, 344 are hingedly connected to bottom frame structure 380; however, this is not required.

The bottom frame structure 380 is illustrated as being connected to frame 410 of movement mechanism 400; however, this is not required. The bottom frame structure 380 includes two base members 386, 388 and two brace members 390, 392. As can be appreciated, the bottom frame structure 380 can have other configurations and can alternatively or additionally include other structures. Frame 410 of movement mechanism 400 includes two side legs 412, 414 and a top bar 416 that connects together the top edges of the two side legs. As can be appreciated, frame 410 can have other configurations. Base member 386 and brace member 390 of the bottom frame structure 380 are connected to leg 412 of the frame of movement mechanism 400. Base member 388 and brace member 392 of the bottom frame structure 380 are connected to leg 414 of the frame of movement mechanism 400. The frame 410 can optionally include a reinforcement member 418 that is connected between legs 412, 414 and provides strength and structural rigidity to the frame; however, this is not required. One or more reinforcement members can be used on the frame. As illustrated in FIGS. 3, 4, and 7-9, reinforcement member 418 is positioned on the lower portion of legs 412, 414 and can optionally function as a lower stop for lift bar 440; however, this is not required.

The frame 410 can optionally include a platform landing 420 upon which a portion of the back wall 240 of the pallet platform 200 rests when the pallet platform is in the fully lower or load position; however, this is not required. The platform landing 420 can function as a stop to prevent further lowering of the pallet platform 200; however, this is not required. As illustrated in FIG. 3, only the back lip 242 of the back wall is designed to engage and rest on platform landing 420; however, this is not required. In such an arrangement, the top surface 210 of the pallet platform is positioned below the landing surface of the platform landing 420 when the back lip 242 of the back wall engages and rests on the landing surface of the platform landing 420; however, this is not required. The platform landing 420 (when used) can alternatively or additionally be connected to the bottom frame structure 380; however, this is not required.

The movement mechanism 400 includes a motor 420, a rotatable threaded bar 430, and a lift bar 440. The type of motor used is non-limiting. Generally, the motor is an electric motor that is powered by a battery source and/or a wall or electric generator outlet; however, this is not required. A gear box can optionally be used with the motor to facilitate in the rotation of the rotatable threaded bar 430 when the motor is activated; however, it can be appreciated that the rotatable threaded bar can be directly connected to the rotating shaft of the motor. As illustrated in FIGS. 3, 4, and 8-10, the motor 420 is positioned at or near the base of frame 410; however, it can be appreciated that motor 420 can be positioned at the top of frame 410 or at some other location. Motor 420 can be connected to reinforcement member 418 or some other or additional part of frame 410. The movement mechanism 400 can optionally include one or more coiled springs, one or more gas springs, one or more counter weights, one or more struts (gas and/or mechanical), one or more ball screw mechanisms, gas and/or hydraulic systems, one or more motors, etc. to create a force necessary to raise and/or lower the pallet platform, and/or partially or fully counter balance the weight of the pallet platform and/or weight of the pallet/goods on the pallet when positioned on the pallet platform.

The rotatable threaded bar 430 is illustrated as being mounted so that the longitudinal axis of the rotatable threaded bar 430 is generally normal to a floor surface and/or the top surface of the pallet platform; however, this is not required. The motor 420 is designed to rotate the rotatable threaded bar 430 clockwise and counterclockwise. The top edge of the rotatable threaded bar 430 is illustrated as being rotatably connected to top bar 416 of frame 410; however, this is not required.

Lift bar 440 includes a back plate 442 and a lift plate 444 having a threaded opening 446. The back plate is illustrated as being positioned on the back side of legs 412, 414 and is designed to slide up and down the backside of the legs when the pallet platform is raised and lowered; however, this is not required. As can be appreciated, the backplate and/or some other portion of the lift bar 440 can be connected to and/or engage one or both legs of the frame to guide the lift bar as the lift bar moves up and down the legs when the pallet platform is raised and lowered; however, this is not required. The lift plate is connected to the back plate and a portion of the threaded bar 430 is positioned in threaded opening or slot 446. The front end 448 of the lift plate is connected to the pallet platform. As illustrated in FIGS. 1, 7, 11, 12, and 14, the front end 448 is connected to back wall 240 of the pallet platform; however, it can be appreciated that the lift plate can be connected to other or additional regions of the pallet platform. The top bar 416 can function as an upper stop for the lift bar; however, this is not required.

In operation, when the motor causes the rotatable threaded bar 430 to rotate in a direction that causes the lift bar to move upwardly along the rotatable threaded bar 430, the lift bar also causes the pallet platform to be raised. Likewise, when the motor causes the rotatable threaded bar 430 to rotate in a direction that causes the lift bar to move downwardly along the rotatable threaded bar 430, the lift bar also causes the pallet platform to be lowered. The height to which the pallet platform can be raised is not non-limiting. Generally, the pallet platform is designed to be raised about 10-50 inches above a floor surface.

The operation of the motor can be by an actuator, by a remote control, and/or by a height sensor. As illustrated in FIGS. 1-10, a control post 396 is connected to a portion of bottom frame structure 380. The control post is connected to and extends upwardly from brace member 390 of the bottom frame structure; however, it can be appreciated that the control post can be connected to other or additional regions on the bottom frame structure and/or on frame 410 of movement mechanism 400 or on the pallet platform. Connected to control post 380 is an actuator 398 that can be used to manually raise and lower the pallet platform. The actuator can include one or more switches to cause the motor to rotate clockwise or counterclockwise. As can be appreciated, the control post can be eliminated and the actuator can be positioned on another location on the pallet lifter; however, this is not required. If the motor is battery operated, one or more battery packs 399 can be connected to the control post or some other location on the pallet lifter; however, this is not required. The battery packs can be designed to be removable from the control post and/or enable batteries to be replaced in the battery packs while the battery packs are connected to the control post; however, this is not required. The batteries in the battery packs can be rechargeable; however, this is not required. The control post is spaced from and to the side of the legs of the frame to allow easy access to the actuator and/or battery packs when the back of the pallet lifter is positioned against a wall or the like; however, this is not required. As can be appreciated, the orientation of the battery packs and/or actuator on the control post, and/or the location of the control post on the pallet lifter are non-limiting.

The pallet lifter can optionally include a height sensor arrangement 600 that senses 1) one or more surfaces on a pallet on the pallet platform, 2) one or more surfaces of the pallet platform, and/or 3) one or more surfaces of items that are positioned on the pallet that is positioned on the pallet platform. The height sensor arrangement can be used to automatically adjust the height of the pallet platform as goods on the pallet are removed from the pallet; however, this is not required. The height sensor arrangement can be used to send a signal to a remote location to provide information about the height of the pallet platform, whether goods still exist on the pallet, the height of the top layer of goods on the pallet, etc.; however, this is not required. The height sensor arrangement can use any type of sensor (e.g., IR sensor, ultrasound sensor, light sensor, etc.). The height sensor can include a controller that processes a signal generated by the sensor and then sends a control signal to the motor and/or motor actuator to cause said motor to activate and/or deactivate, and/or to cause the motor to rotate in a certain direction; however, this is not required. As illustrated in FIGS. 1-10, the sensor 610 of the height sensor arrangement is located on the upper portion of control post 380. As can be appreciated, sensor 610 can be located on other regions of the pallet lifter. As can be appreciated, the pallet lifter can be used without a height sensor arrangement as illustrated in FIGS. 11-14.

Figure 11:
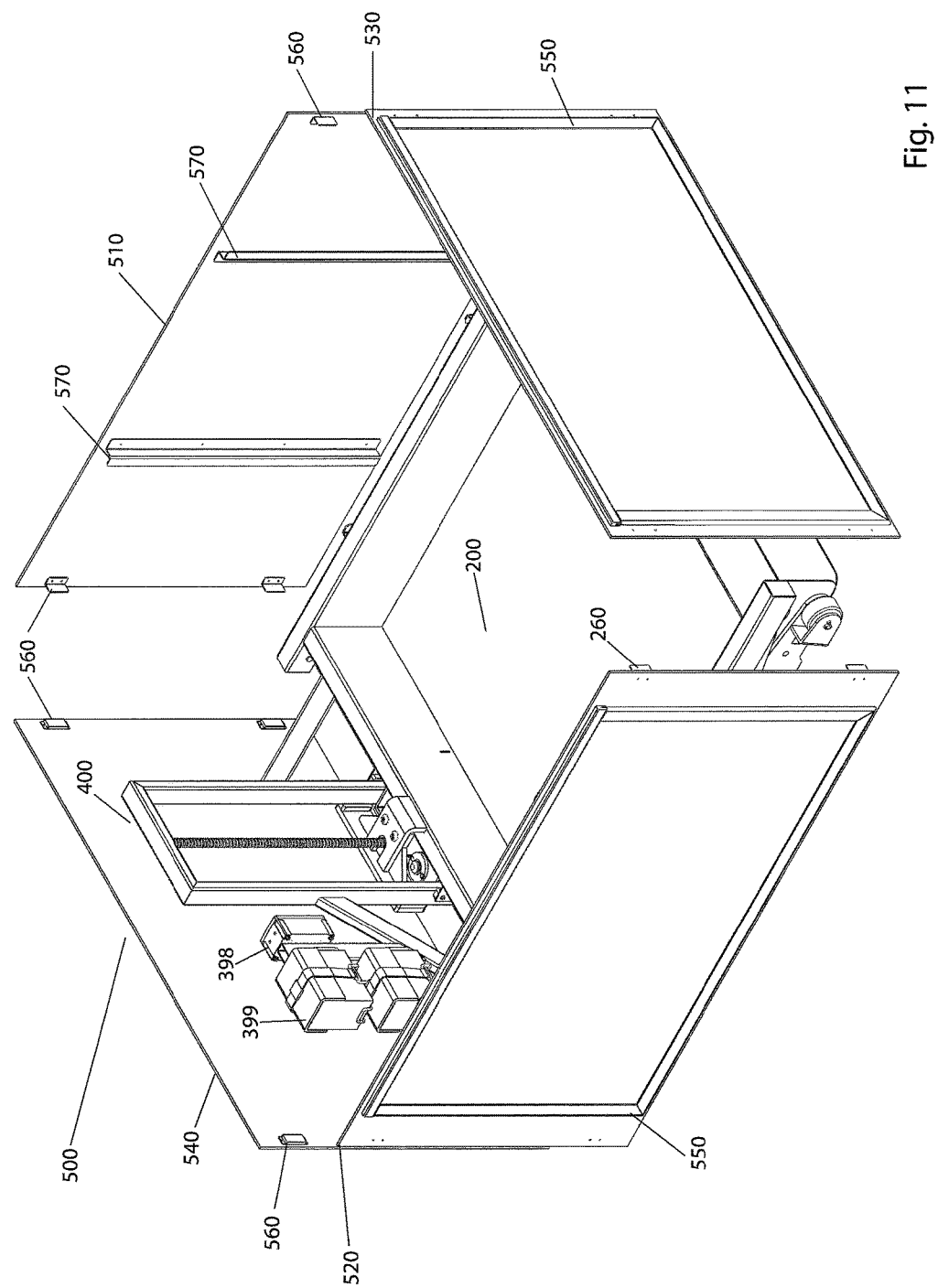
FIG. 11 is a front elevation view of the pallet lifter of FIG. 1 that is absent a height sensor and includes a disassembled screen positioned about the frame of the pallet lifter.
Figure 12:
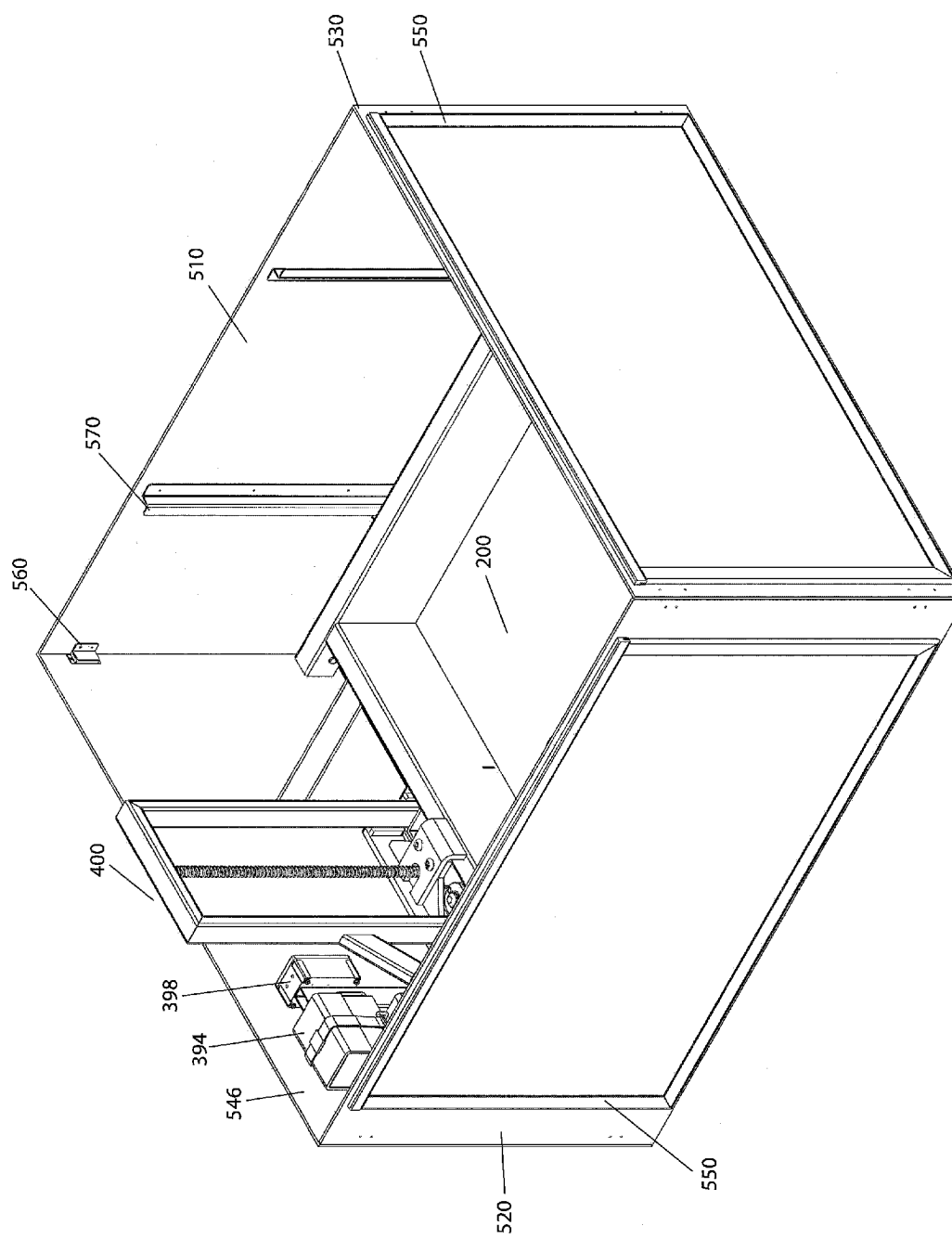
FIG. 12 is a front elevation view of the pallet lifter of FIG. 1 that is absent a height sensor and includes an assembled screen positioned about the frame of the pallet lifter.
Figure 13:
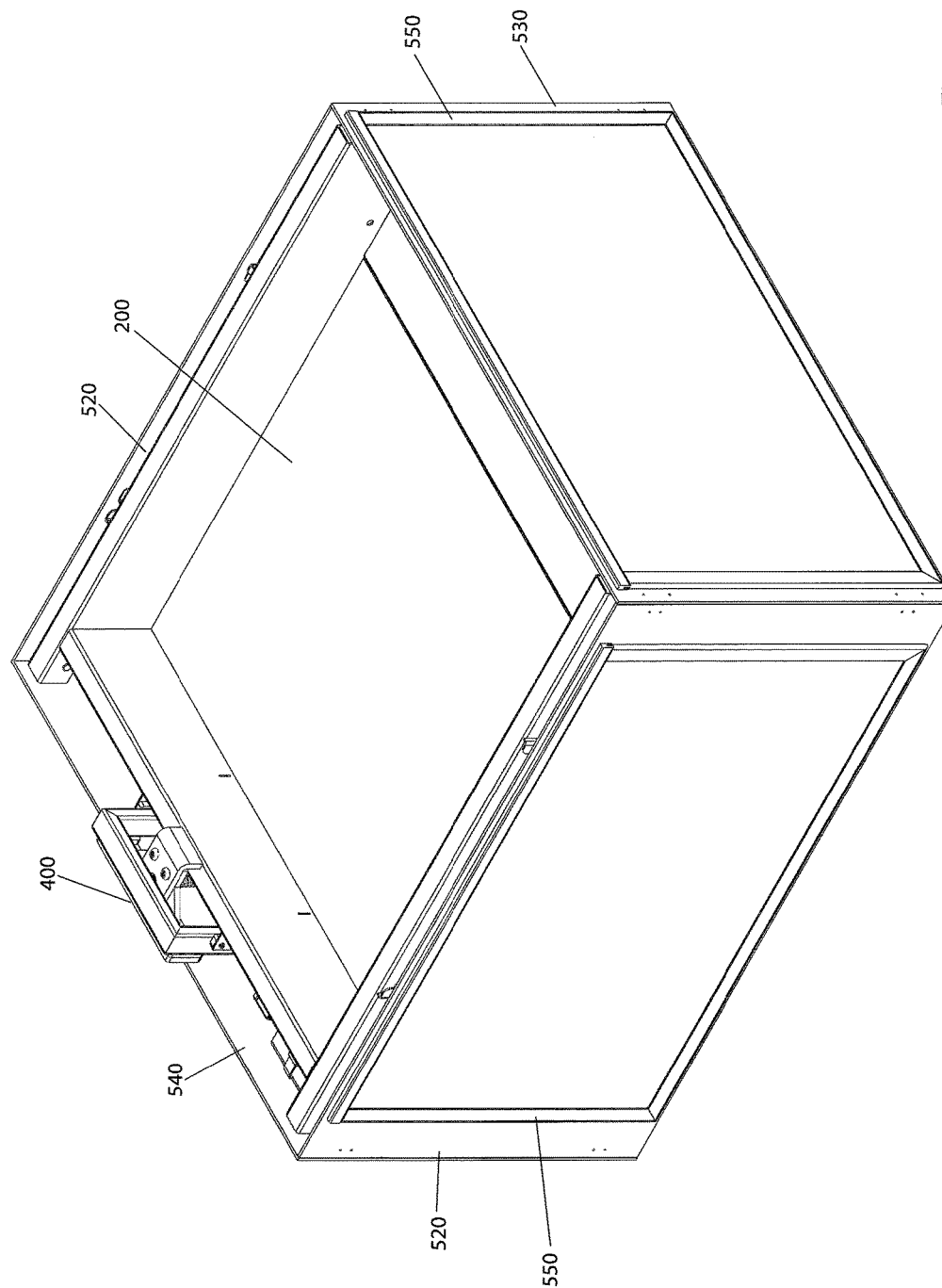
FIG. 13 is a front elevation view of the pallet lifter of FIG. 6 that is absent a height sensor and includes an assembled screen positioned about the frame of the pallet lifter.
Figure 14:
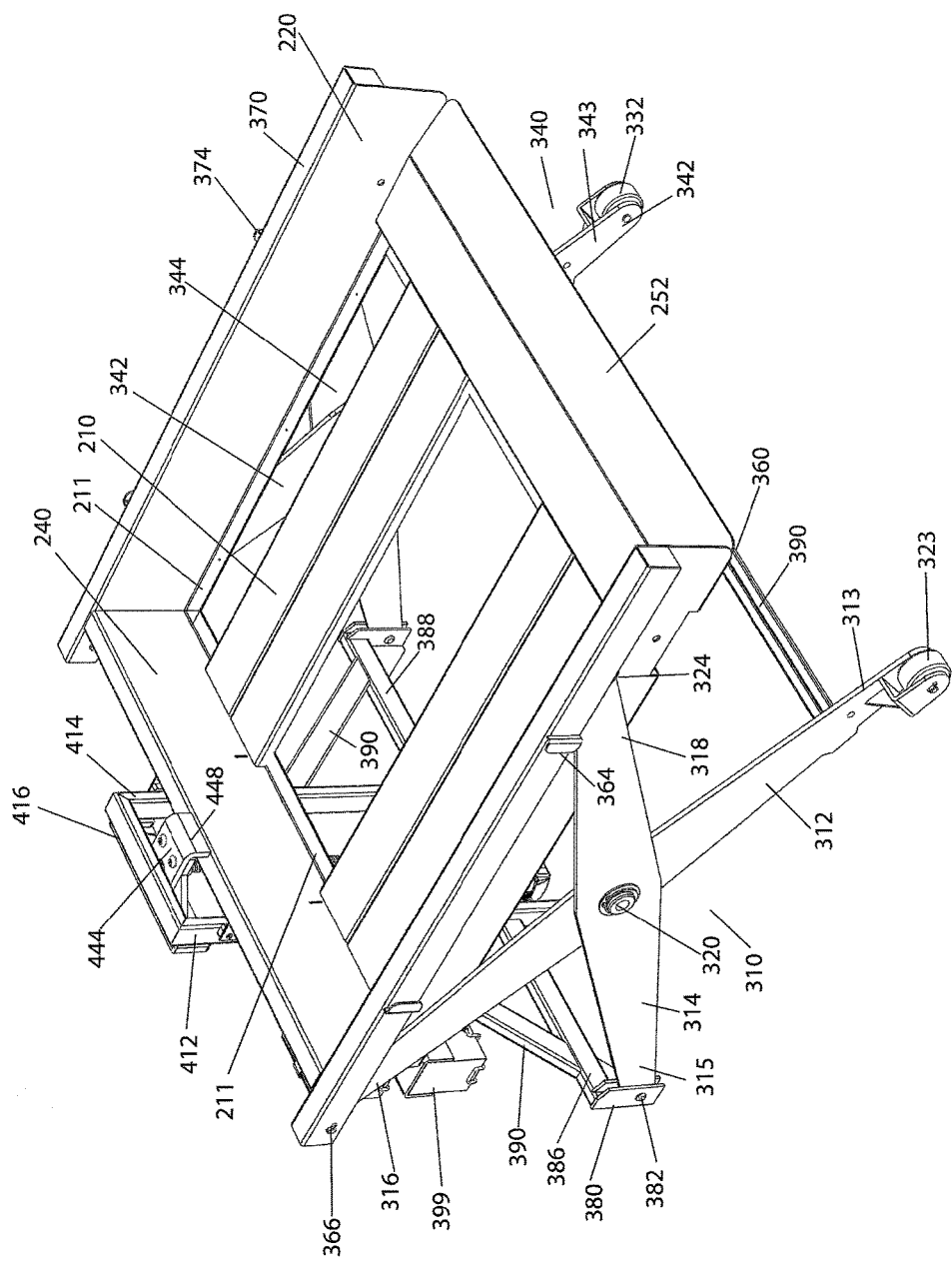
FIG. 14 is a front elevation view of the pallet lifter of FIG. 1 wherein the pallet platform is in the fully upper or fully raised position and the pallet platform has been modified.
Figure 15:
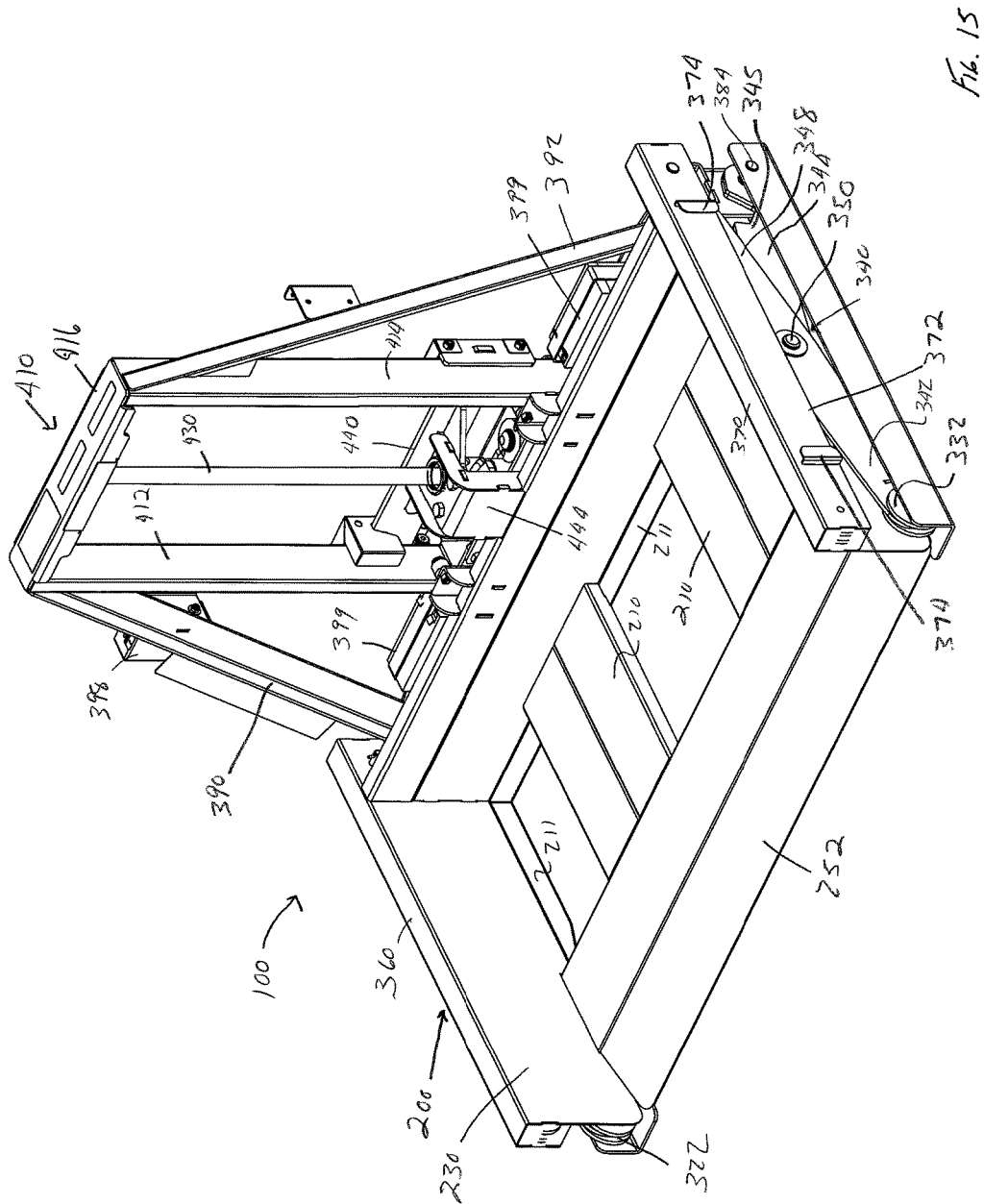
FIG. 15 is a front elevation view of another non-limiting configuration of the pallet lifter in accordance with the present invention wherein the pallet platform is in the fully lower or loading position.

Referring now to FIGS. 11-13, a display frame 500 is illustrated as being positioned about the pallet platform 200 and lifting frame 300 of the pallet lifter 100. The display frame is illustrated as including four frame sections 510, 520, 530, 540. As can be appreciated, the display frame can have less than four or more than four frame sections. The height of each of the frame sections is illustrated as being generally the same; however, this is not required. The front surface of one or more of the frame sections can optionally include a display holder 550 that can be used to mount product information, advertising material, etc. to the front surface of the one or more of the frame sections. The configuration of the display holder is non-limiting. Generally, the display holder is designed to allow product information, advertising material, etc. to be removably secured to the front surface of the one or more frame sections; however, this is not required. One or more of the frame sections can optionally include connectors 560 that enable two or more frame sections to be connected together. The connectors on each of the frame sections can be the same or different. As illustrated in FIG. 11, the connectors 560 on the inner surface of frame sections 510, 520 have a generally L-shape and connectors 560 on the inner surface of frame sections 530, 540 have a slot configuration that is designed to receive a leg from the L-shape, and connectors 560 on frame sections 530, 540 when the frame sections are connected together. As can be appreciated, other or additional connector configurations can be used on one or more of the frame sections.

The inner surface of frame sections 510 and 520 include a lift frame connector 570 that is designed to engage panel connectors 364, 374 on the lifting frame 300. The panel connectors and the lift frame connectors are designed to engage one another and retain frame sections 510 and 520 close to the pallet platform as the pallet platform moves between a raised and lowered position. As illustrated in FIGS. 12 and 13, the panel connectors and the lift frame connectors are designed to slide relative to one another as the pallet platform moves between a raised and lowered position. Such a sliding arrangement allows the display frame to remain on the floor surface as the pallet platform moves between a raised and lowered position while retaining the display frame in position relative to the pallet platform and lifting frame as the pallet platform moves between a raised and lowered position. As illustrated in FIG. 11, lift frame connectors 570 have a generally L-shape and a leg of the lift frame connector 570 is designed to engage the panel connectors 364, 374 and slide in a slot formed by the panel connectors 364, 374; however, this is not required.

Referring now to FIGS. 15-19, an alternative pallet lifter 100 is illustrated. The pallet lifter has many of the same structures and features of the pallet lifter illustrated in FIGS. 1-14. As such, similar structures of the pallet lifter illustrated in FIGS. 15-19 will use the same reference numbers as used in describing the pallet lifter illustrated in FIGS. 1-14. The primary structural differences between the pallet lifter illustrated in FIGS. 15-19 and the pallet lifter illustrated in FIGS. 1-14 are a) the brace members 390, 392 are connected to different locations on back side of legs 412, 414, b) lift plate 444 has a modified shape, c) the location of motor 420, d) the shape and configuration of pallet platform 200, e) the configuration of base members 386, 388, f) the inclusion of base legs on the frame of the movement mechanism, g) the orientation of the legs to one another, h) the location of one or more battery packs 399, i) the inclusion of a motor housing 460, and j) the absent of the height sensor arrangement 600. Also, the operation and advantages of the pallet lifter illustrated in FIGS. 15-19 are the same or similar to pallet lifter illustrated in FIGS. 1-14, thus will not be repeated herein. As will be described with reference to FIGS. 20 and 21, the pallet lifter illustrated in FIGS. 15-19 can optionally include a height sensor arrangement 600. Motor housing 460 is designed to protect the motor and gearing of the pallet lifter. The configuration of the motor housing is non-limiting. As illustrated in FIG. 16, a single base member 388 exists instead of base members 386, 388 as illustrated in FIG. 3. The frame of the movement mechanism includes two base legs 470, 474. The two base legs are positioned generally parallel to one another. A brace 478 can be connected between the two base legs to provide rigidity and strength to the base legs. Each base leg includes a base 471, 475 and a side wall 472, 476. Wheel 322 is designed to move on the top surface of base 471 and wheel 332 is designed to move on the top surface of base 475 as the pallet platform is raised and lowered. The side wall on each base leg is designed to maintain wheels 322, 332 on the top surface of base of the respective base leg. As illustrated in FIG. 17, leg 348 is positioned on the outside of leg 344, and leg 312 is positioned on the outside of leg 314. This positioning is reverse of the legs illustrated in FIGS. 1-14. This leg positioning is used to maintain wheels 322, 332 on the top surface of base of the respective base leg.

Referring now to FIGS. 20-21, there is illustrated a housing 620 for a height sensor arrangement 600. This height sensor arrangement 600 can optionally be used on the pallet lifter illustrated in FIGS. 1-19 and 22-25. The housing 620 can have any shape or configuration. As illustrated in FIG. 21, the housing is formed of two pieces 630, 650. These two pieces are designed to be connected together to form a protective cavity wherein the sensor 610 is located so as to protect the sensor from damage. Piece 630 includes a back plate 632 and three flanges 640, 642, 644. Flange 642 optionally includes a rod opening 646 that receive a portion of the top of threaded bar 430. The housing can be used to replace top bar 416 or be positioned on top bar 416. Piece 650 includes a front plate 660 and flanges 670, 672, 674. Flanges 670, 672, 674 are designed to be positioned on the inner surface of flanges 640, 642, 644; however, it can be appreciated that one or more of flanges 670, 672, 674 can be designed to be positioned on the outer surface of flanges 640, 642, 644. The front plate 660 includes three sensor openings 662, 664, 666; however, it can be appreciated that the front plate can include one or two openings or more than three openings. The sensor 610 is illustrated as having a sensor strip 612 and three sensor elements 614, 616, 618 connected to the sensor strip. It can be appreciated that the sensor strip can include one or two sensor elements or more than three sensor elements. Generally, the number of sensor elements is equal to the number of openings in front plate 660. Also, the openings in front plate 660 are typically spaced so as to orient with the sensor elements on the sensor strip; however, this is not required. The size and shape of the openings are generally the same as the sensor element that is associated with a particular opening; however, this is not required.

Referring now to FIGS. 22-26, another alternative pallet lifter 100 is illustrated. The pallet lifter has many of the same structures and features of the pallet lifter illustrated in FIGS. 1-14. As such, similar structures of the pallet lifter illustrated in FIGS. 22-26 will use the same reference numbers as used in describing the pallet lifter illustrated in FIGS. 1-14. The primary structural differences between the pallet lifter illustrated in FIGS. 22-26 and the pallet lifter illustrated in FIGS. 1-14 are a) the absence of brace members 390, 392, b) lift plate 444 has a modified shape, c) the location of motor 420, d) the shape and configuration of pallet platform 200, e) the configuration of base members 386, 388, f) the inclusion of base legs on the frame of the movement mechanism, g) the absence of the legs, h) the absence the battery packs 399, i) the inclusion of a motor housing 460, j) the absence of actuator 398, and k) the absence of the height sensor arrangement 600. Also, the operation and advantages of the pallet lifter illustrated in FIGS. 22-26 are the same or similar to pallet lifter illustrated in FIGS. 1-14, thus will not be repeated herein. As described above with reference to FIGS. 20 and 21, the pallet lifter illustrated in FIGS. 22-26 can optionally include a height sensor arrangement 600. Motor housing 460 is designed to protect the motor and gearing of the pallet lifter. The configuration of the motor housing is non-limiting. As illustrated in FIG. 23, a single base member 388 exists instead of base members 386, 388 as illustrated in FIG. 3. Although not shown, the pallet lifter can optionally include a) the absence of brace members 390, 392, b) one or more battery packs 399, and/or c) an actuator 398. As illustrated in FIG. 23, the frame movement mechanism includes two guide plates 480, 482 that are connected to lift bar 440. One guide plate is connected to each side of lift bar 440. Each guide plate and the lift bar 440 include one or more guide posts 484 that are positioned about one or more sides of the legs 412, 414. The number of guide posts used is non-limiting. Generally, each guide plate and the lift bar includes a plurality of guide posts. The guide posts are used to maintain the guide plates and lift bar in the proper position relative to legs 412, 414 as the pallet platform is raised and lowered. As illustrated in FIG. 23, each of the guide plates is connected to a connection bar 490 that is secured to the back face of the pallet platform 200. One or both of legs 412, 414 can optionally include a stop post 486 that limits the height to which the pallet platform can be raised. The frame of the movement mechanism includes two base legs 470, 474. The two base legs are positioned generally parallel to one another. A brace (not shown) can optionally be connected between the two base legs to provide rigidity and strength to the base legs. Each base leg includes a base 471, 475 and two side walls 472, 473, 476, 477. As can be appreciated, one or both side walls are optional. A portion of the motor housing 460 is connected between the two legs to provide rigidity and structural support to two legs. As can be appreciated, the connection of the motor housing to the two legs is optional. Each of the two legs are illustrated as being positioned inwardly of at least 10% of the length of base member 388, and typically 15-20% of the length of base member 388 from the end edge of base member 388. As can be appreciated, each of the legs can be connected to each end of base member 388. As illustrated in FIGS. 25 and 26, leg 412 is connected to base leg 470 and leg 414 is connected to base leg 474; however, this is not required.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall therebetween. The invention has been described with reference to the preferred embodiments. These and other modifications of the preferred embodiments as well as other embodiments of the invention will be obvious from the disclosure herein, whereby the foregoing descriptive matter is to be interpreted merely as illustrative of the invention and not as a limitation. It is intended to include all such modifications and alterations insofar as they come within the scope of the appended claims.

What is claimed:

1. A pallet lifter for raising and lowering a pallet, said pallet lifter includes a pallet platform, a movement mechanism that controllably causes said pallet platform to raise and lower, said pallet platform including a top surface configured to support the pallet, two side walls and a back wall, said two side walls and said back wall are configured to facilitate in positioning and maintaining the pallet on said top surface of the pallet platform, said movement mechanism including a height sensor, movement frame, a motor, a lift plate and a threaded rod, said movement frame having a bottom support structure that prevents tipping of the movement frame when the pallet lifter moves between and upper and lower portion, said bottom support structure non-movable, said movement frame supporting said threaded rod, said motor configured to cause said threaded rod to rotate in a clockwise and counterclockwise direction, said rotation of said threaded rod configured to cause said pallet platform to raise and lower, said threaded rod oriented to be non-parallel to a longitudinal axis of said pallet platform, said threaded rod located rearwardly of said back wall of said pallet platform, said lift plate having a threaded opening, said threaded opening engaging said threaded rod and configured to move along a longitudinal length of said threaded rod when said threaded rod rotates, said lift plate connected to said pallet platform, said height sensor including a plurality of sensors positioned in a cavity of a protective housing, said protective housing configured to prevent materials contacting said plurality of sensors, said protective housing including at least one opening, at least one of said plurality of sensors aligned with said opening when positioned in said cavity of said housing, said height sensor configured to detect a) a surface on the pallet when on said pallet platform, b) a surface of said pallet platform, or c) a surface of an item positioned on the pallet that is positioned on said pallet platform, said sensor generating a signal to be used to adjust the height of said pallet platform, at least one of said plurality of sensors is connected to the movement frame, at least a portion of the sensor is always positioned above a top surface of the pallet platform, said protective housing includes a plurality of openings, at least one of said plurality of sensors aligned with each opening in said protective housing.

2. The pallet lifter as defined in claim 1, including a display panel positioned fully about said lifting frame, said display panel oriented about said pallet platform so as to maintain said display panel in position relative to said pallet platform as said pallet platform raises and lowers, said display panel configured to remain in position and not be raised or lowered as said pallet platform is raised and lowered.

3. A method for automatically controlling a height of a pallet platform of a pallet lifter comprising:

providing said pallet lifter, said pallet lifter including said pallet platform, a movement mechanism that controllably causes said pallet platform to raise and lower, said pallet platform including a top surface configured to support a pallet located in said pallet platform, two side walls and a back wall, said two side walls and said back wall are configured to facilitate in positioning and maintaining the pallet on said top surface of the pallet platform, said movement mechanism including movement frame, a motor, a lift plate and a threaded rod, said movement frame supporting said threaded rod, said motor configured to cause said threaded rod to rotate in a clockwise and counterclockwise direction, rotation of said threaded rod configured to cause said pallet platform to raise and lower, said threaded rod oriented to be non-parallel to a longitudinal axis of said pallet platform, said threaded rod located rearwardly of said back wall of said pallet platform, said lift plate having a threaded opening, said threaded opening engaging said threaded rod and configured to move along a longitudinal length of said threaded rod when said threaded rod rotates, said lift plate connected to said pallet platform;

providing a height sensor on said movement mechanism, said height sensor including a plurality of sensors positioned in a protective housing, at least one of said plurality of sensors is always positioned above a top surface of the pallet platform, said height sensor configured to detect a) a surface on the pallet when on said pallet platform, b) a surface of said pallet platform, or c) a surface of an item positioned on the pallet that is positioned on said pallet platform, said sensor generating a signal to be used to adjust the height of said pallet platform; and, adjusting a height of said pallet platform by detecting the height of said pallet platform by said height sensor and then comparing said detected height to a preset height or desired height and then causing said pallet platform to be raised or lowered to said preset height or desired height.

4. The method as defined in claim 3, wherein said protective housing includes a plurality of openings, at least one of said plurality of sensors aligned with each opening in said protective housing.

5. The method as defined in claim 3, including a display panel positioned fully about the lifting frame, the display panel oriented about the pallet platform so as to maintain the display panel in position relative to the pallet platform as the pallet platform raises and lowers, the display panel connected to the top frame structure, the top frame structure including a plurality of panel connectors each defining a slot, the display panel including a plurality of L-shape display connectors that are each received in a respective slot of a respective panel connector, the display connectors and the panel connectors slidably engaged such that the display panel remains connected to the top frame structure as the pallet platform raises and lowers and allows the display panel to remain in position and not be raised or lowered as the pallet platform raises and lowers.

* * * * *